US009883018B2

(12) United States Patent
Kim et al.

(10) Patent No.: US 9,883,018 B2
(45) Date of Patent: Jan. 30, 2018

(54) APPARATUS FOR RECORDING CONVERSATION AND METHOD THEREOF

(71) Applicant: Samsung Electronics Co., Ltd., Suwon-si, Gyeonggi-do (KR)

(72) Inventors: So-Ra Kim, Seoul (KR); Jin-Yong Kim, Yongin-si (KR); Hyun-Kyoung Kim, Seoul (KR); Hee-Woon Kim, Suwon-si (KR); Yu-Mi Ahn, Hanam-si (KR); Ji-Hyun Ahn, Seoul (KR)

(73) Assignee: Samsung Electronics Co., ltd., Suwon-si (KR)

( * ) Notice: Subject to any disclaimer, the term of this patent is extended or adjusted under 35 U.S.C. 154(b) by 172 days.

(21) Appl. No.: 14/221,863

(22) Filed: Mar. 21, 2014

(65) Prior Publication Data
US 2014/0343938 A1    Nov. 20, 2014

(30) Foreign Application Priority Data
May 20, 2013    (KR) ......................... 10-2013-0056772

(51) Int. Cl.
*G10L 15/26* (2006.01)
*H04M 1/656* (2006.01)
*G06F 3/16* (2006.01)

(52) U.S. Cl.
CPC ............ *H04M 1/656* (2013.01); *G06F 3/167* (2013.01); *G10L 15/26* (2013.01)

(58) Field of Classification Search
None
See application file for complete search history.

(56) References Cited

U.S. PATENT DOCUMENTS

| 7,053,938 | B1 | 5/2006 | Sherry | |
|---|---|---|---|---|
| 2003/0154084 | A1* | 8/2003 | Li | G06K 9/00228 704/273 |
| 2004/0093220 | A1 | 5/2004 | Kirby et al. | |
| 2007/0118380 | A1* | 5/2007 | Konig | B60R 16/0373 704/270 |
| 2007/0143103 | A1 | 6/2007 | Asthana et al. | |
| 2008/0295040 | A1* | 11/2008 | Crinon | H04N 7/152 715/865 |
| 2009/0089055 | A1* | 4/2009 | Caspi | H04M 3/56 704/235 |

(Continued)

FOREIGN PATENT DOCUMENTS

| JP | 2005-295015 A | 10/2005 |
|---|---|---|
| JP | 2010-81457 A | 4/2010 |
| KR | 10-2011-0103232 A | 9/2011 |

OTHER PUBLICATIONS

MD. Rashidul Hasan et al., "Speaker Identification Using Mel Frequency Cepstral Coefficients", 3rd International Conference on Electrical & Computer Engineering ICECE 2004, XP055351795, pp. 565-568, Dec. 28, 2004, Dhaka, Bangladesh.

*Primary Examiner* — Douglas Godbold
(74) *Attorney, Agent, or Firm* — Jefferson IP Law, LLP

(57) ABSTRACT

A method for recording conversation is provided. The method includes capturing content, receiving at least one voice signal, distinguishing at least one person corresponding to the at least one voice signal by analyzing the at least one voice signal, converting the at least one voice signal into a text corresponding to the at least one voice signal, and displaying the text in the captured content to correspond to the distinguished at least one person.

23 Claims, 17 Drawing Sheets

(56) References Cited

U.S. PATENT DOCUMENTS

| | | | |
|---|---|---|---|
| 2009/0094029 A1* | 4/2009 | Koch | H04M 3/42221 704/246 |
| 2009/0112589 A1* | 4/2009 | Hiselius | H04M 1/576 704/246 |
| 2010/0039498 A1* | 2/2010 | Liu | G09B 21/00 348/14.09 |
| 2010/0080536 A1 | 4/2010 | Marumori | |
| 2010/0250252 A1 | 9/2010 | Yasohima | |
| 2012/0053936 A1* | 3/2012 | Marvit | G10L 15/26 704/235 |
| 2013/0144603 A1* | 6/2013 | Lord | H04L 12/1831 704/9 |
| 2013/0144623 A1* | 6/2013 | Lord | G09B 21/006 704/249 |
| 2013/0162752 A1* | 6/2013 | Herz | H04N 7/15 348/14.08 |
| 2013/0246064 A1* | 9/2013 | Wasserblat | G10L 25/78 704/244 |
| 2014/0081634 A1* | 3/2014 | Forutanpour | G06F 17/289 704/235 |
| 2014/0163982 A1* | 6/2014 | Daborn | G10L 15/26 704/235 |
| 2014/0278417 A1* | 9/2014 | Chen | G10L 17/06 704/246 |
| 2015/0112748 A1* | 4/2015 | Kaye | H04M 3/56 705/7.19 |

* cited by examiner

APPARATUS FOR RECORDING CONVERSATION AND METHOD THEREOF

CROSS-REFERENCE TO RELATED APPLICATION(S)

This application claims the benefit under 35 U.S.C. § 119(a) of a Korean patent application filed on May 20, 2013 in the Korean Intellectual Property Office and assigned Serial No. 10-2013-0056772, the entire disclosure of which is hereby incorporated by reference.

TECHNICAL FIELD

The present disclosure relates to an apparatus for recording a conversation and a method thereof. More particularly, the present disclosure relates to an apparatus for efficiently recording and displaying the conversation and a method thereof.

BACKGROUND

Recently, mobile devices have been rapidly developed. In particular, the mobile devices may capture (or shoot) content such as photos and videos using a built-in camera. In addition, the mobile devices may have a built-in microphone. The mobile devices may receive and record voice signals using the microphone.

Generally, however, the mobile devices provide simple services of displaying the intact captured content such as captured photos or videos on a display, or playing the intact recorded voice signals using a speaker.

Therefore, there is a need to provide useful services to users by processing the recorded voice signals picked up by the microphone together with the captured content such as photos and videos captured by the camera of the mobile devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a conversation recording apparatus capable of distinguishing at least one person corresponding to at least one voice signal, and displaying the text that is converted from the at least one voice signal and that corresponds to the at least one voice signal, in the captured content to correspond to the at least one person, and a method thereof.

In accordance with an aspect of the present disclosure, a method for recording conversation is provided. The method includes capturing content, receiving at least one voice signal, distinguishing at least one person corresponding to the at least one voice signal by analyzing the at least one voice signal, converting the at least one voice signal into a text corresponding to the at least one voice signal, and displaying the text in the captured content to correspond to the distinguished at least one person.

In accordance with another aspect of the present disclosure, an apparatus for recording conversation is provided. The apparatus includes a controller configured to capture content, to receive at least one voice signal, to distinguish at least one person corresponding to the at least one voice signal by analyzing the at least one voice signal, to convert the at least one voice signal into a text corresponding to the at least one voice signal, and to display the text in the captured content to correspond to the distinguished at least one person, a camera configured to capture the content, and a display configured to display the content.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
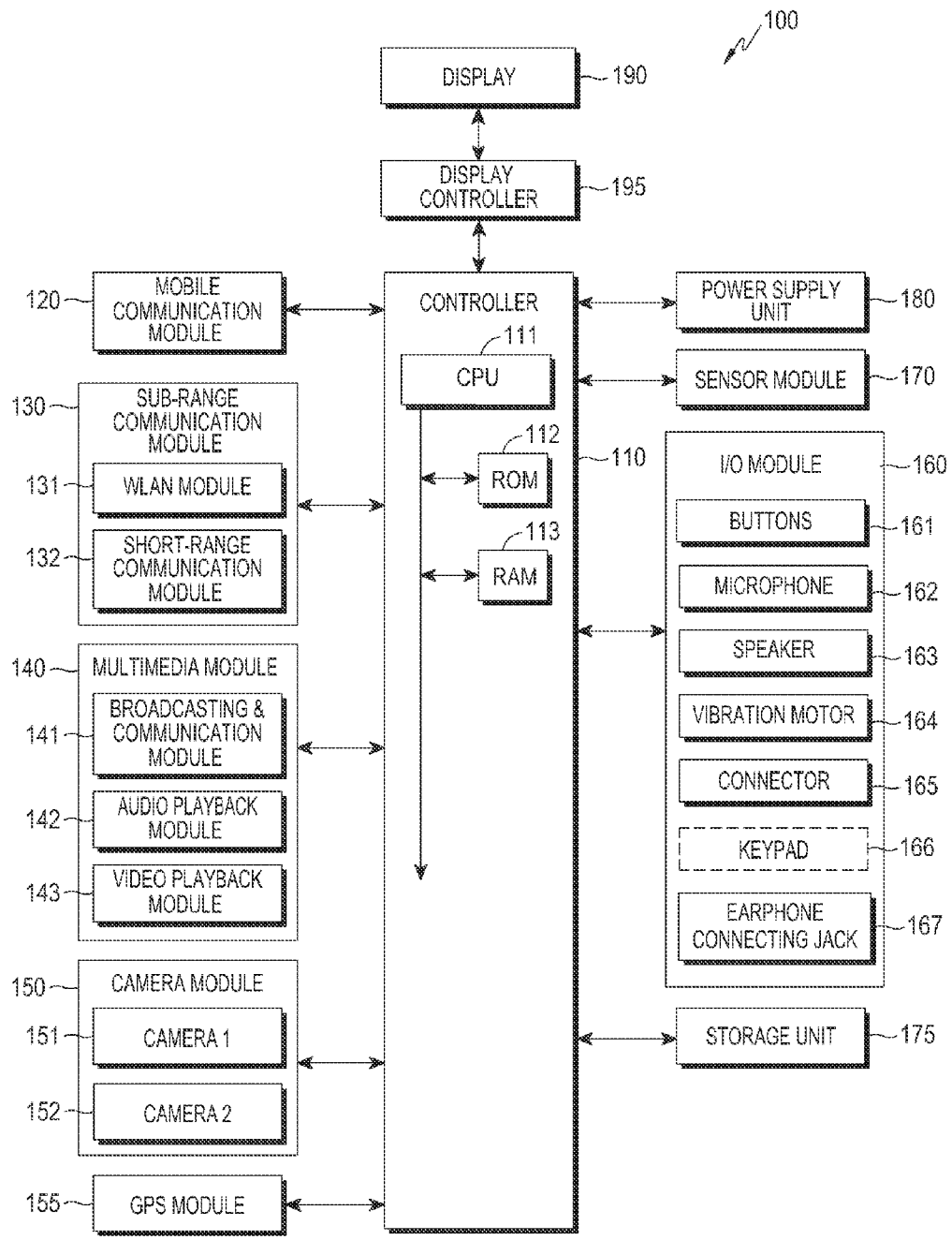
FIG. 1 is a schematic block diagram illustrating a mobile device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used in this document, including the Claims section, the words "a" or "an" mean one or more than one. The term "plurality" means two or more than two. The term "another" is defined as a second or more. The words "comprising", "including", "having" and the like are open ended. Reference herein to "one embodiment", "embodiments", "an embodiment" or similar term means that a particular feature, structure, or characteristic described in connection with the embodiment is included in at least one embodiment. The appearances of such phrases in various places throughout this disclosure are not necessarily all referring to the same embodiment. Furthermore, the particular features, structures, or characteristics may be combined in any suitable manner on one or more various embodiments without limitation. The terms "may" or "can" are used herein to refer to at least an optional element, feature, function, characteristic, advantage, etc., of a described embodiment. Terms such as "substantially" or "generally" signify equality or an approximation with respect to a parameter. Herein, the terms "he", "she", "his" and "her" are not gender specific and refer to any user.

The devices, to which various embodiments of the present disclosure are applicable, may correspond to Personal Computers (PCs), mobile devices and smart Televisions (TVs). Although a mobile device will be considered herein by way of example, the present disclosure is not limited to the mobile device.

As a non-exhaustive illustration only, a mobile device described herein may refer to mobile devices such as a cellular phone, a Personal Digital Assistant (PDA), a digital camera, a portable game console, an MP3 player, a Portable/Personal Multimedia Player (PMP), a handheld e-book, a tablet PC, a portable lap-top PC, a Global Positioning System (GPS) navigation, and the like capable of wireless communication or network communication consistent with that disclosed herein.

FIG. 1 is a schematic block diagram illustrating a mobile device according to an embodiment of the present disclosure.

Referring to FIG. 1, a mobile device 100 may include a controller 110, a mobile communication module 120, a sub-range communication module 130, a multimedia module 140, a camera module 150, a GPS module 155, an Input/Output (I/O) module 160, a sensor module 170, a storage unit 175, a power supply unit 180, a display unit 190, and a display controller 195.

The mobile device 100 may be connected to the external devices (not shown) using external device connecting units such as the sub-communication module 130, a connector 165 and an earphone connecting jack 167. The 'external devices' may include a variety of devices, which are normally detached from the mobile device 100 and may be connected to the mobile device 100 by wire, such as earphones, external speakers, Universal Serial Bus (USB) memories, chargers, cradles, docking stations, Digital Multimedia Broadcasting (DMB) antennas, mobile payment devices, health care devices (e.g., blood glucose meters, and the like), game consoles, car navigation devices, and the like. In addition, the 'external devices' may include short-range communication devices, which can be wirelessly connected to the mobile device 100 by short-range communication, such as Bluetooth communication devices and Near Field Communication (NFC) devices; WiFi Direct communication devices, and the like, and wireless Access Points (APs). Further, the external devices may include other devices, cellular phones, smart phones, tablet PCs, desk-top PCs, servers, and the like.

The sub-communication module 130 includes at least one of a wireless Local Area Network (LAN) module 131 and a short-range communication module 132.

The multimedia module 140 includes at least one of a broadcasting & communication module 141, an audio playback module 142, and a video playback module 143.

The camera module 150 includes at least one of a first camera 151 and a second camera 152.

The I/O module 160 includes at least one of a button(s) 161, a microphone 162, a speaker 163, a vibration motor 164, the connector 165, a keypad 166, and the earphone connecting jack 167.

In the following description, the display 190 and the display controller 195 will be assumed to be a touch screen and a touch screen controller, respectively.

The controller 110 may include a Central Processing Unit (CPU) 111, a Read Only Memory (ROM) 112 for storing control programs for control of the mobile device 100, and a Random Access Memory (RAM) 113 that temporarily stores signals or data received from the outside of the mobile device 100, and/or is used as a workspace for operations performed in the mobile device 100. The CPU 111 may be a single-core CPU or a CPU having a plurality of cores. For example, the CPU 111 may include a single-core CPU, a dual-core CPU, a triple-core CPU, a quad-core CPU, and the like. The CPU 111, the ROM 112 and the RAM 113 may be connected to each other via an internal bus.

The controller 110 may control the mobile communication module 120, the sub-communication module 130, the multimedia module 140, the camera module 150, the GPS module 155, the I/O module 160, the sensor module 170, the storage unit 175, the power supply unit 180, the touch screen 190 and the touch screen controller 195.

The mobile communication module 120, under control of the controller 110, may connect the mobile device 100 to the external devices by mobile communication using at least one or multiple antennas (not shown). The mobile communication module 120 exchanges radio signals for voice calls, video calls, Short Message Service (SMS) messages, Multimedia Messaging Service (MMS) messages and the like, with cellular phones, smart phones, table PCs and/or other devices, phone numbers of all of which are entered in the mobile device 100.

The sub-communication module 130 may include at least one of the wireless LAN module 131 and the short-range communication module 132. For example, the sub-communication module 130 may include one or both of the wireless LAN module 131 and the short-range communication module 132.

The wireless LAN module 131, under control of the controller 110, may be connected to the Internet in the place where a wireless AP is installed. The wireless LAN module 131 supports the wireless LAN standard IEEE802.11x defined by Institute of Electronics and Electrical Engineers (IEEE). The short-range communication module 132, under control of the controller 110, may perform wireless short-range communication between the mobile device 100 and image forming devices (not shown). The short-range communication may include Bluetooth, Infrared Data Association (IrDA), WiFi-Direct, NFC, and the like.

The mobile device 100 may include at least one of the mobile communication module 120, the wireless LAN module 131, and the short-range communication module 132. For example, the mobile device 100 may include a combination of the mobile communication module 120, the wireless LAN module 131 and the short-range communication module 132.

The multimedia module 140 may include at least one of the broadcasting & communication module 141, the audio playback module 142 and the video playback module 143. The broadcasting & communication module 141, under control of the controller 110, may receive broadcast signals (e.g., TV broadcast signals, radio broadcast signals, and/or data broadcast signals) and additional broadcast information (e.g., Electric Program Guide (EPG), Electric Service Guide (ESG), and/or the like), all of which are sent from broadcasting stations via broadcasting & communication antennas (not shown). The audio playback module 142, under control of the controller 110, may play the stored or received digital audio files (with a files extension of, for example, mp3, wma, ogg, way, or the like). The video playback module 143, under control of the controller 110, may play the stored or received digital video files (with a file extension of, for example, mpeg, mpg, mp4, avi, mov, mkv, or the like). The video playback module 143 may play the digital audio files as well.

The multimedia module 140 may include the audio playback module 142 and the video playback module 143, excluding the broadcasting & communication module 141. The audio playback module 142 and/or the video playback module 143 in the multimedia module 140 may be incorporated into the controller 110.

The camera module 150 may include at least one of the first camera 151 and the second camera 152, which capture still images and/or videos under control of the controller 110. At least one of the first camera 151 and the second camera 152 may include an auxiliary light source (e.g., a flash) that provides the light needed for content shooting. The first camera 151 may be mounted on the front of the mobile device 100, and the second camera 152 may be mounted on the back of the mobile device 100. In an alternative way, the first camera 151 and the second camera 152 may be mounted adjacent to each other, with a gap set between (e.g., 1 cm and 8 cm), making capture of three-Dimensional (3D) still images or videos possible.

The GPS module 155 may receive radio waves from multiple GPS satellites (not shown) in the Earth orbit, and calculate the location of the mobile device 100 using the Time of Arrival (ToA) from the GPS satellites to the mobile device 100.

The I/O module 160 may include at least one of the buttons 161, the microphone 162, the speaker 163, the vibration motor 164, the connector 165, the keypad 166, and the like.

The buttons 161 may be formed on the front, side and/or rear of the housing of the mobile device 100, and may include at least one of a Power/Lock button, a Volume button, a Menu button, a Home button, a Back button, a Search button, and the like.

The microphone 162, under control of the controller 110, picks up voice or sound and converts the voice or sound into electrical signals.

The speaker 163, under control of the controller 110, may output the sounds corresponding to various signals (e.g., radio signals, broadcast signals, digital audio files, digital video files, and/or shooting sounds) of the mobile communication module 120, the sub-communication module 130, the multimedia module 140 and/or the camera module 150, to the outside of the mobile device 100. The speaker 163 may output the sounds (e.g., button manipulation tones and ring back tones for phone calls) corresponding to the functions performed by the mobile device 100. One or multiple speakers 163 may be formed in a proper position or positions of the housing of the mobile device 100.

The vibration motor 164, under control of the controller 110, may convert electrical signals into mechanical vibrations. For example, if the mobile device 100 in a vibration mode receives a voice call from another device, the vibration motor 164 operates. One or multiple vibration motors 164 may be formed in the housing of the mobile device 100. The vibration motor 164 may operate in response to a user's touch operation on the touch screen 190 and a continuous movement of the touch on the touch screen 190.

The connector 165 may be used as an interface for connecting the mobile device 100 to the external devices or the power source. The mobile device 100, under control of the controller 110, may transmit the data stored in the storage unit 175 to the external devices, and may receive the data from the external devices, via a wired cable connected to the connector 165. In this case, the external device may be a docking station, and the data may be input signals, which are received from the external devices such as, for example, a mouse, a keyboard, and/or the like. The mobile device 100 may receive the power supplied from the power source via a wired cable connected to the connector 165, and charge a rechargeable battery operatively connected to or integrated with the mobile device 100 (not shown) with the received power.

The keypad 166 may receive key inputs from the user to control the mobile device 100. The keypad 166 includes a physical keypad (not shown) formed on the mobile device 100, and/or virtual keypad (not shown) displayed on the touch screen 190. The physical keypad formed on the mobile device 100 may be optional depending on the performance and/or structure of the mobile device 100.

An earphone (not shown) may be connected to the mobile device 100 as it is inserted into the earphone connecting jack 167.

The sensor module 170 includes at least one sensor for detecting the status of the mobile device 100. For example, the sensor module 170 may include a proximity sensor for determining whether the user is close to the mobile device 100, and an illuminance sensor for detecting the amount of light around the mobile device 100. In addition, the sensor module 170 may include a gyro sensor. The gyro sensor may detect operations (e.g., rotations, accelerations, vibrations, and the like) of the mobile device 100, detect the point of the compass using the Earth's magnetic field, and detect the direction of the gravity applied to the mobile device 100. In addition, the sensor module 170 may include an altimeter for detecting the altitude by measuring the atmospheric pressure. The at least one sensor may detect the status of the mobile device 100, generate a signal corresponding to the detection results, and transfer the signal corresponding to the detection results to the controller 110. The at least one sensor of the sensor module 170 may be added or removed depending on the performance of the mobile device 100.

The storage unit 175, under control of the controller 110, may store the signals or data which are input and output to correspond to operations of the mobile communication module 120, the sub-communication module 130, the multimedia module 140, the camera module 150, the GPS module 155, the I/O module 160, the sensor module 170 and the touch screen 190. The storage unit 175 may store control programs for control of the mobile device 100 or the controller 110, and a variety of applications.

The term 'storage unit' as used herein may be construed to include the storage unit 175, the ROM 112 and RAM 113 in the controller 110, and/or a memory card (e.g., a Secure Digital (SD) card, a memory stick, and the like) mounted in the mobile device 100. The storage unit may include non-volatile memory, volatile memory, Hard Disc Drive (HDD) and/or Solid State Drive (SSD).

The power supply unit 180, under control of the controller 110, may supply power to one or multiple batteries (not shown) mounted in the housing of the mobile device 100. The one or multiple batteries supply power to the mobile device 100. The power supply unit 180 may supply, to the mobile device 100, the power that is received from the external power source via a wired cable connected to the connector 165. The power supply unit 180 may also supply, to the mobile device 100, the power that is wirelessly received from the external power source by wireless charging technology.

The touch screen 190 may provide the user with user interfaces corresponding to various services (e.g., call, data transmission, broadcasting, photo taking, and the like). The touch screen 190 may transfer an analog signal corresponding to at least one touch being input to a user interface, to the touch screen controller 195. The touch screen 190 may receive at least one touch through the user's body (e.g., fingers including the thumb) or the touch input means (e.g., a stylus pen, or the like). The touch screen 190 may also receive the continuous movement of one touch, among at least one touch. The touch screen 190 may transfer an analog signal corresponding to the received continuous movement of the touch, to the touch screen controller 195.

The term 'touch' as used herein is not limited to the physical touch between the touch screen 190 and the user's body or the touch input means, and may include non-contact touch between the touch screen 190 and the user's body or the touch input means. A gap, at which the touch screen 190 can detect the touch, is subject to change depending on the performance and/or structure of the mobile device 100.

The touch screen 190 may be implemented in, for example, a resistive type, a capacitive type, an infrared type, an acoustic wave type, or the like.

The touch screen controller 195 converts an analog signal received from the touch screen 190 into a digital signal (e.g., X and Y coordinate signal) and transfers the digital signal to the controller 110. The controller 110 may control the touch screen 190 using the digital signal received from the touch screen controller 195. For example, in response to a touch, the controller 110 may select or execute an associated shortcut icon displayed on the touch screen 190. The touch screen controller 195 may be incorporated into the controller 110.

Figure 2:
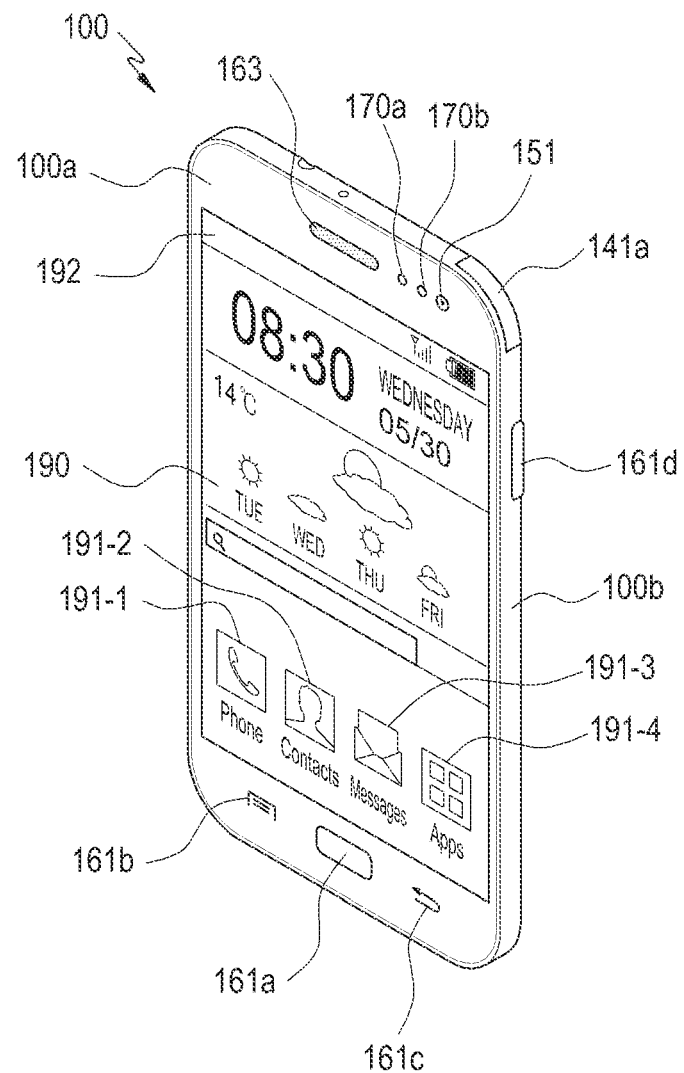
FIG. 2 is a front perspective view of a mobile device according to an embodiment of the present disclosure.
Figure 3:
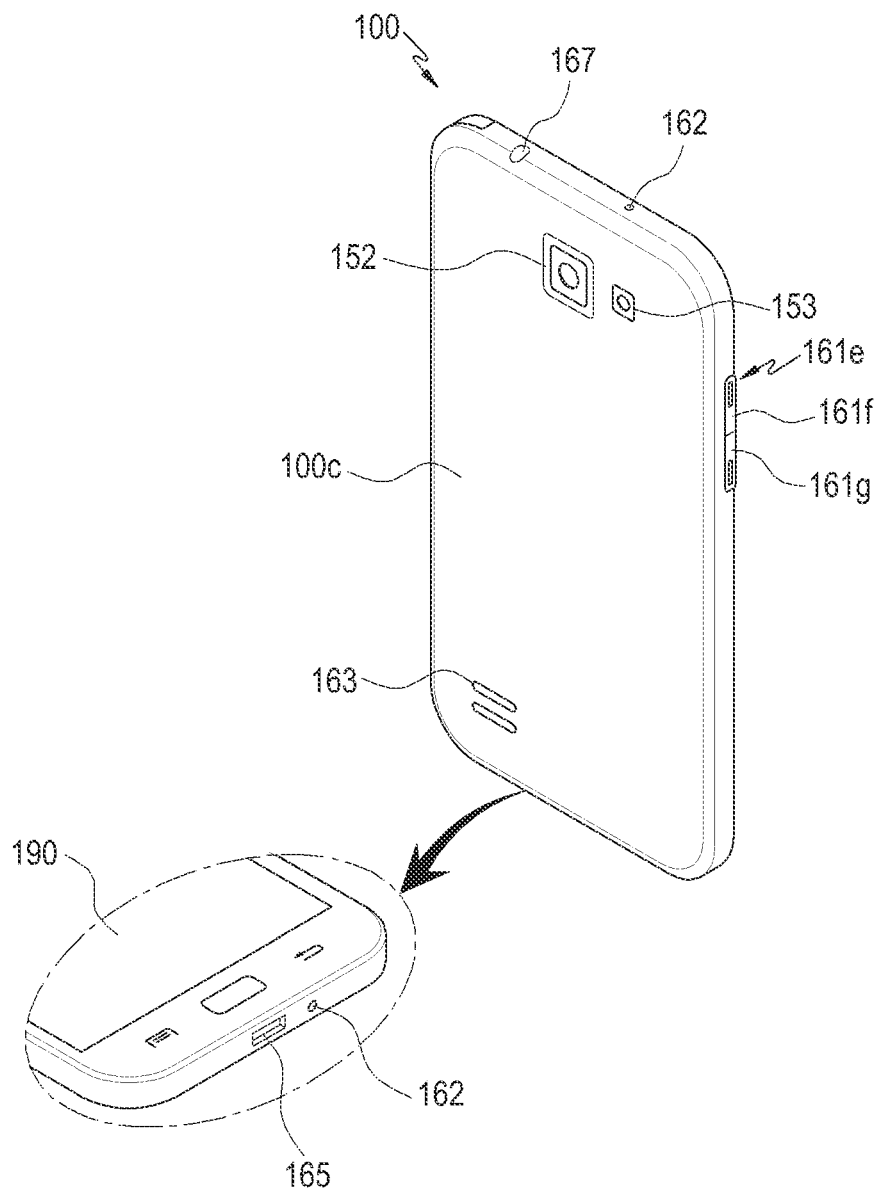
FIG. 3 is a rear perspective view of a mobile device according to an embodiment of the present disclosure.

FIG. 2 is a front perspective view of a mobile device according to an embodiment of the present disclosure. FIG. 3 is a rear perspective view of a mobile device according to an embodiment of the present disclosure.

Referring to FIG. 2, the touch screen 190 is mounted in the center of the front 100a of the mobile device 100. The touch screen 190 is formed large enough to occupy most of the front 100a of the mobile device 100. In the example of FIG. 2, a main home screen is displayed on the touch screen 190. The main home screen is the first screen that is displayed on the touch screen 190 when the mobile device 100 is powered on (e.g., when the mobile device 100 has completed the booting/loading process). When the mobile device 100 has different home screens of several pages, the main home screen may be the first home screen among the home screens of several pages. On the home screen may be displayed shortcut icons 191-1, 191-2 and 191-3 for executing the frequently used applications, an application switching key 191-4, the time, the date, weather, and the like. The application switching key 191-4 is used to display application icons indicating applications on a screen of the touch screen 190. On the top of the touch screen 190 may be formed a status bar 192 for displaying the status of the mobile device 100, such as battery status, received signal strength and current time.

Under the touch screen 190 may be formed a home button 161a, a menu button 161b, and a back button 161c.

The home button 161a is used to display the main home screen on the touch screen 190. For example, if the home button 161a is pressed or touched by the user while any home screen different from the main home screen, or a menu screen is displayed on the touch screen 190, the main home screen may be displayed back onto the touch screen 190. If the home button 161a is pressed or touched by the user while applications are being executed on the touch screen 190, the main home screen illustrated in FIG. 2 may be displayed back onto the touch screen 190. The home button 161a may be used to display the recently used applications and/or a task manager on the touch screen 190.

The menu button 161b is used to provide connection menus that can be used on the touch screen 190. The connection menus may include a widget add menu, a wallpaper change menu, a search menu, an edit menu, a preference menu, and the like. The menu button 161b may be used to provide a connection menu connected to an application during execution of the application.

The back button 161c may be used to display the previous screen or to terminate the most recently used application.

Referring to FIG. 2, on the edge of the front 100a of the mobile device 100 may be mounted the first camera 151, an illuminance sensor 170a and a proximity sensor 170b.

Referring to FIG. 3, on the rear 100c of the mobile device 100 may be mounted the second camera 152, a flash 153, and the speaker 163.

On the side 100b of the mobile device 100 may be mounted, for example, a power/reset button 161d. A side of the mobile device 100 may also have mounted thereon a volume control button 161e (e.g., including a volume up button 161f and a volume down button 161g), a terrestrial DMB antenna 141a for broadcast reception, one or multiple microphones 162, and the like. The DMB antenna 141a may be formed to be fixed to the mobile device 100, or to be detachable from the mobile device 100.

The connector 165 is formed in the bottom side of the mobile device 100. Multiple electrodes are formed in the connector 165, and may be connected to the external devices by wire. The earphone connecting jack 167 may be formed in the top side of the mobile device 100. An earphone may be inserted into the earphone connecting jack 167.

Figure 4:
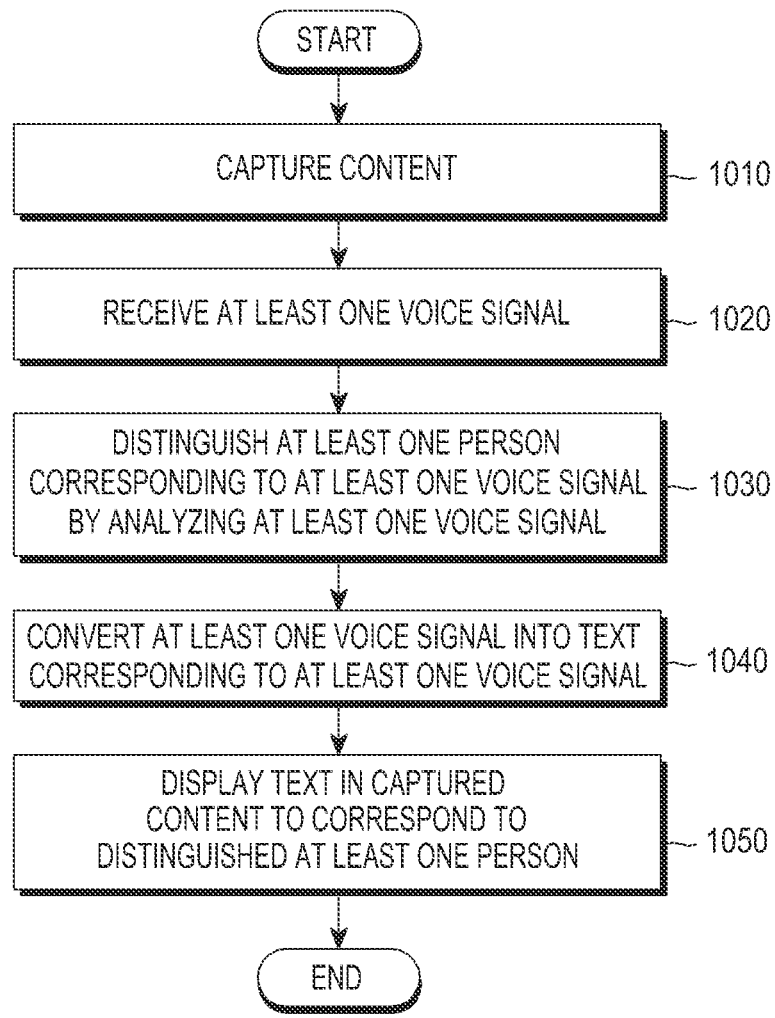
FIG. 4 is a flowchart illustrating a conversation recording method according to an embodiment of the present disclosure.

FIG. 4 is a flowchart illustrating a conversation recording method according to an embodiment of the present disclosure. FIGS. 5A, 5B, 5C, 5D, and 5E illustrate a screen of a conversation recording apparatus according to an embodiment of the present disclosure.

Figure 5:
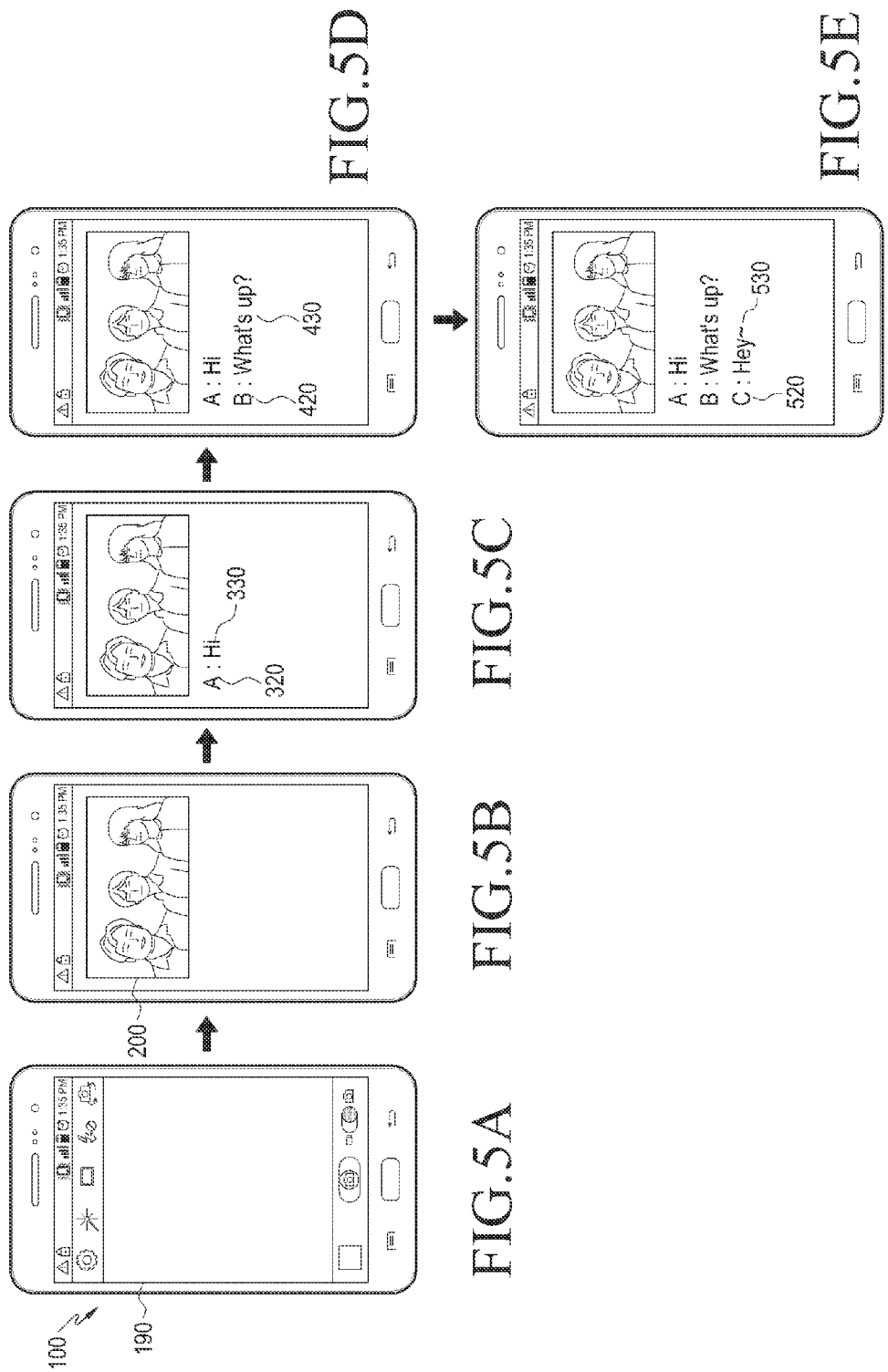
FIGS. 5A, 5B, 5C, 5D, and 5E illustrate a screen of a conversation recording apparatus according to an embodiment of the present disclosure.

Referring to FIG. 4, at operation 1010, the controller 110 of the mobile device 100 first captures or shoots content. The controller 110 may capture content using the camera module 150. For example, the content may be photos or videos. The captured content may be stored in the storage unit 175. Referring to FIG. 5A, the controller 110 may capture a photo by running a camera application. The controller 110 may display the captured photo 200 on the display 190 as illustrated in FIG. 5B.

At operation 1020, the controller 110 receives at least one voice signal. The controller 110 may receive at least one voice signal using the microphone 162. The received at least one voice signal may be stored in the storage unit 175.

At operation 1030, the controller 110 distinguishes at least one person corresponding to the at least one voice signal by analyzing the at least one voice signal. The controller 110 may distinguish at least one person corresponding to the at least one voice signal by analyzing the at least one voice signal. In other words, the at least one voice signal may be a plurality of voice signals, and the at least one person may be a plurality of persons. The controller 110 may determine that a first voice signal among the plurality of voice signals corresponds to a first person among the plurality of persons. Similarly, the controller 110 may determine that a second voice signal among the plurality of voice signals corresponds to a second person among the plurality of persons. In the same way, the controller 110 may determine that a third voice signal among the plurality of voice signals corresponds to a third person among the plurality of persons. The controller 110 may distinguish at least one person corresponding to the at least one voice signal by identifying the frequency and strength of the at least one voice signal. In this way, the controller 110 may distinguish each of the at least one voice signal having different unique frequency and strength. For example, by analyzing the at least one voice signal, the controller 110 may distinguish the first person A corresponding to the first voice signal, the second person B corresponding to the second voice signal, and the third person C corresponding to the third voice signal.

At operation 1040, the controller 110 converts the at least one voice signal into a text corresponding to the at least one voice signal. The controller 110 may convert the at least one voice signal into a text corresponding to the at least one voice signal by analyzing the frequency and strength of the at least one voice signal. The plurality of voice signals may include the first voice signal, the second voice signal, and the third voice signal. Therefore, the controller 110 may convert the first voice signal into a first text, the second voice signal into a second text, and the third voice signal into a third text. For example, the controller 110 may convert the first voice signal into the first text such as 'Hi', the second voice signal into the second text such as 'What's up?', and the third voice signal into the third text such as 'Hey-'.

At operation 1050, the controller 110 displays the text in the captured content to correspond to the distinguished at least one person. The controller 110 may sequentially display the text in the captured content to correspond to the distinguished at least one person in chronological order of the at least one voice signal.

For example, as illustrated in FIG. 5C, the controller 110 may display the first text such as 'Hi' 330 in the captured photo 200 to correspond to the first person A 320. As illustrated in FIG. 5D, the controller 110 may display the second text such as 'What's up?' 430 in the captured photo 200 to correspond to the second person B 420. As illustrated in FIG. 5E, the controller 110 may display the third text such as 'Hey-' 530 in the captured photo 200 to correspond to the third person C 520. The controller 110 may sequentially display the first to third texts in the captured photo to correspond to the first to third persons, respectively, in chronological order of the first to third voice signals.

In sum, according to various embodiments of the present disclosure, an apparatus and method may distinguish at least one person corresponding to at least one voice signal, and display the text that is converted from the at least one voice signal and that corresponds to the at least one voice signal, in the captured content to correspond to the at least one person. In other words, according to various embodiments of the present disclosure, the apparatus and method may display not only the text that is converted from the at least one voice signal and that corresponds to the at least one voice signal, but also the text corresponding to the at least one voice signal, in the captured content to correspond to the at least one person. Therefore, the user may immediately recognize that the text converted from the at least one voice signal and corresponding to the at least one voice signal corresponds to at least one person on a one-to-one basis.

Figure 6:
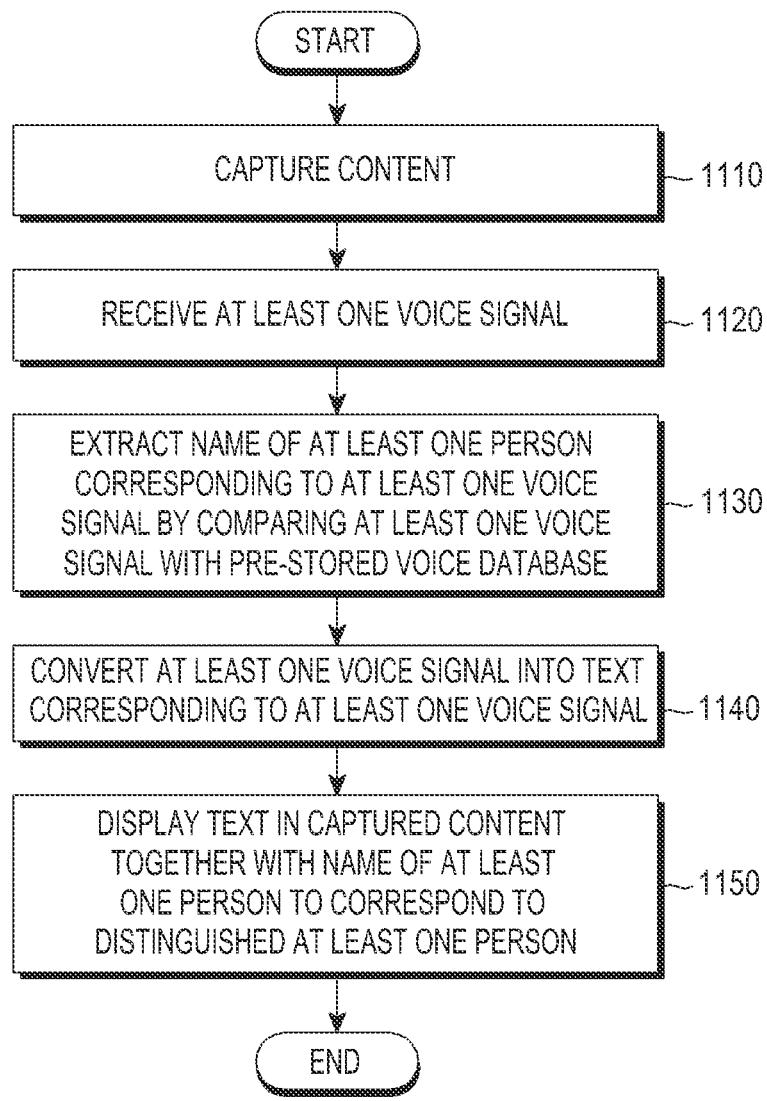
FIG. 6 is a flowchart illustrating a conversation recording method according to an embodiment of the present disclosure.

FIG. 6 is a flowchart illustrating a conversation recording method according to an embodiment of the present disclosure. FIGS. 7A, 7B, 7C, 7D, and 7E illustrate a screen of a conversation recording apparatus according to an embodiment of the present disclosure.

Figure 7:
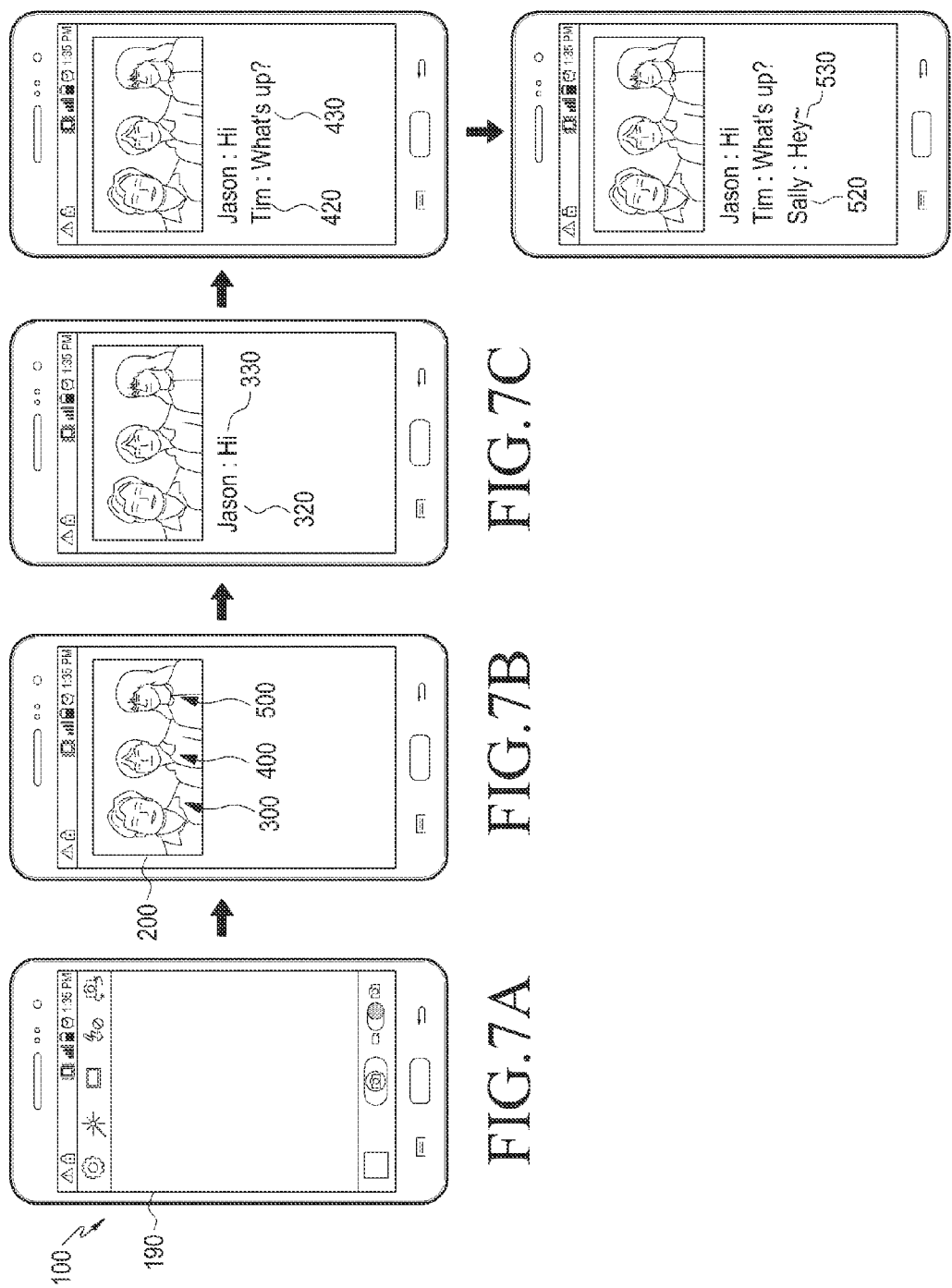
FIGS. 7A, 7B, 7C, 7D, and 7E illustrate a screen of a conversation recording apparatus according to an embodiment of the present disclosure.

Referring to FIG. 6, at operation 1110, the controller 110 of the mobile device 100 first captures content. The controller 110 may capture content using the camera module 150. For example, the content may be photos or videos. The captured content may be stored in the storage unit 175. Referring to FIG. 7A, the controller 110 may capture a photo by running a camera application. As illustrated in FIG. 7B, the controller 110 may display the captured photo 200 on the display 190.

At operation 1120, the controller 110 receives at least one voice signal. The controller 110 may receive at least one voice signal using the microphone 162. The received at least one voice signal may be stored in the storage unit 175.

At operation 1130, the controller 110 extracts a name of at least one person corresponding to the at least one voice signal by comparing the at least one voice signal with a pre-stored voice database. The controller 110 may extract a name of at least one person corresponding to the at least one voice signal by comparing the at least one voice signal with the pre-stored voice database.

The controller 110 may distinguish at least one person corresponding to the at least one voice signal by identifying the frequency and strength of the at least one voice signal. In other words, the controller 110 may distinguish each of the at least one voice signal having different unique frequency and strength.

The controller 110 may extract a name of at least one person corresponding to the at least one voice signal by comparing the at least one voice signal with a pre-stored voice database. The pre-stored voice database may be formed of a voice signal that is stored in advance during a phone call, and a name stored in a contact list.

The at least one voice signal may be a plurality of voice signals, and the at least one person may be a plurality of persons. Therefore, by comparing a first voice signal among the plurality of voice signals with the pre-stored voice database, the controller 110 may determine that the first voice signal corresponds to a first person among the plurality of persons. The controller 110 may extract a name (e.g., Jason) of the first person corresponding to the first voice signal from the pre-stored voice database. In addition, by comparing a second voice signal among the plurality of voice signals with the pre-stored voice database, the controller 110 may determine that the second voice signal corresponds to a second person among the plurality of persons. The controller 110 may extract a name (e.g., Tim) of the second person corresponding to the second voice signal from the pre-stored voice database. In addition, by comparing a third voice signal among the plurality of voice signals with the pre-stored voice database, the controller 110 may determine that the third voice signal corresponds to a third person among the plurality of persons. The controller 110 may extract a name (e.g., Sally) of the third person corresponding to the third voice signal from the pre-stored voice database.

At operation 1140, the controller 110 converts the at least one voice signal into a text corresponding to the at least one voice signal. The controller 110 may convert the at least one voice signal into a text corresponding to the at least one voice signal by analyzing the frequency and strength of the at least one voice signal. The plurality of voice signals may include the first voice signal, the second voice signal, and the third voice signal. Therefore, the controller 110 may convert the first voice signal into a first text, the second voice signal into a second text, and the third voice signal into a third text. For example, the controller 110 may convert the first voice signal into the first text such as 'Hi', the second voice signal into the second text such as 'What's up?', and the third voice signal into the third text such as 'Hey-'.

At operation 1150, the controller 110 displays the text in the captured content together with a name of the at least one person to correspond to the distinguished at least one person. The controller 110 may sequentially display the text in the captured content together with a name of the at least one person to correspond to the distinguished at least one person in chronological order of the at least one voice signal.

For example, as illustrated in FIG. 7C, the controller 110 may display the first text such as 'Hi' 330 in the captured photo 200 together with a name 320 of the first person 300 such as 'Jason' to correspond to the first person 300. As illustrated in FIG. 7D, the controller 110 may display the second text such as 'What's up?' 430 in the captured photo 200 together with a name 420 of the second person 400 such as 'Tim' to correspond to the second person 400. As illustrated in FIG. 7E, the controller 110 may display the third text such as 'Hey-' 530 in the captured photo 200 together with a name 520 of the third person 500 such as 'Sally' to correspond to the third person 500. The controller 110 may sequentially display the first to third texts in the captured photo together with names of the first to third persons to correspond to the first to third persons, respectively, in chronological order of the first to third voice signals.

In sum, according to various embodiments of the present disclosure, an apparatus and method may distinguish at least one person corresponding to at least one voice signal, and display the text that is converted from the at least one voice signal and that corresponds to the at least one voice signal, in the captured content together with a name of the at least one person to correspond to the distinguished at least one person. In other words, according to various embodiments of the present disclosure, the apparatus and method may display not only the text that is converted from the at least one voice signal and that corresponds to the at least one voice signal, but also the text corresponding to the at least one voice signal, in the captured content together with a name of the at least one person to correspond to the distinguished at least one person. Therefore, the user may immediately recognize that the text converted from the at least one voice signal and corresponding to the at least one voice signal corresponds to at least one person through a name of the at least one person. Therefore, according to various embodiments of the present disclosure, the apparatus and method may display the text converted from the at least one voice signal together with a name of the at least one person corresponding to the at least one voice signal. In this case, a user such as a person with hearing impairments may easily understand in real time the conversation made between the participants of the conversation, by simply watching the texts which are displayed together with the names of the persons corresponding to the texts.

Figure 8:
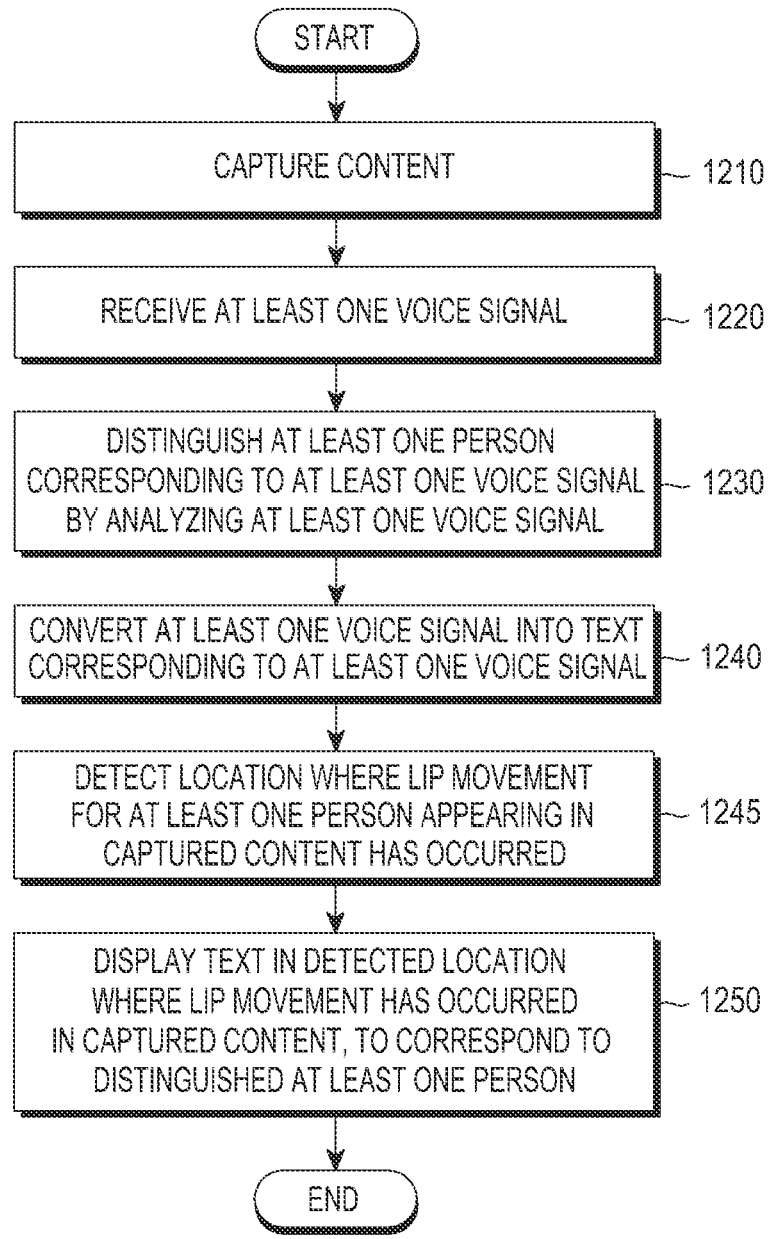
FIG. 8 is a flowchart illustrating a conversation recording method according to an embodiment of the present disclosure.

FIG. 8 is a flowchart illustrating a conversation recording method according to an embodiment of the present disclosure. FIGS. 9A, 9B, 9C, and 9D illustrate a screen of a conversation recording apparatus according to an embodiment of the present disclosure.

Figure 9:
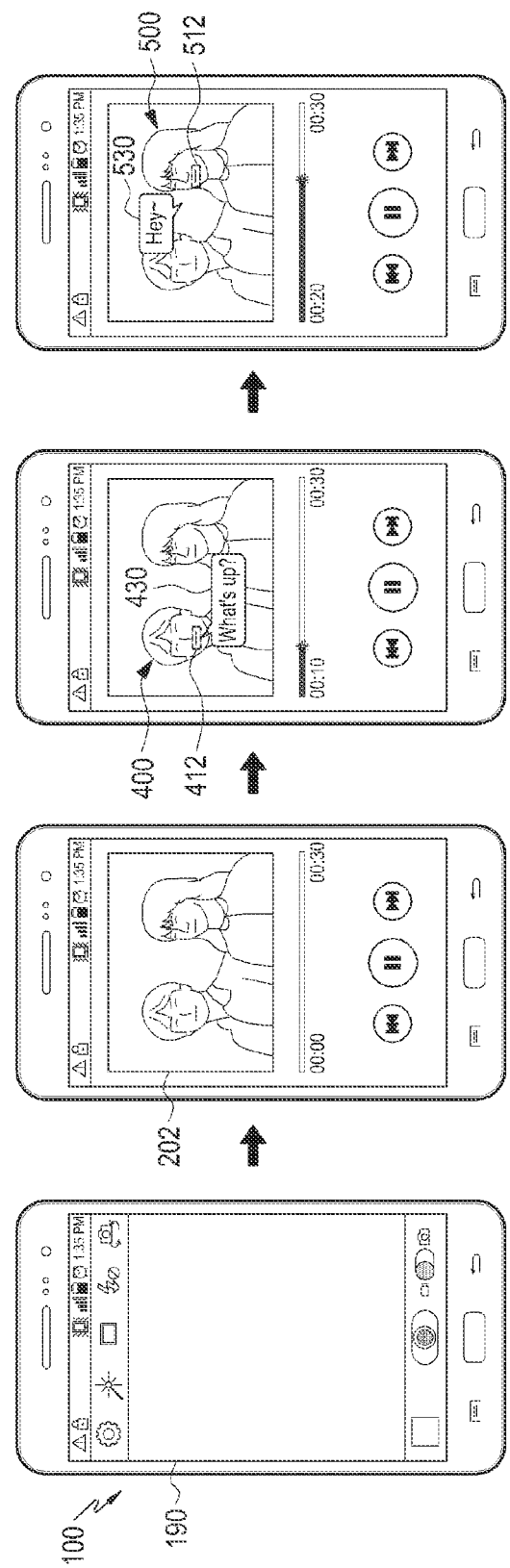
FIGS. 9A, 9B, 9C, and 9D illustrate a screen of a conversation recording apparatus according to an embodiment of the present disclosure.

Referring to FIG. 8, at operation 1210, the controller 110 of the mobile device 100 first captures content. The controller 110 may capture content using the camera module 150. For example, the content may be photos or videos. The captured content may be stored in the storage unit 175. Referring to FIG. 9A, the controller 110 may capture video by running a camera application. As illustrated in FIG. 9B, the controller 110 may display the captured video 202 on the display 190.

At operation 1220, the controller 110 receives at least one voice signal. The controller 110 may receive at least one voice signal using the microphone 162. The received at least one voice signal may be stored in the storage unit 175.

At operation 1230, the controller 110 distinguishes at least one person corresponding to the at least one voice signal by analyzing the at least one voice signal. The controller 110 may distinguish at least one person corresponding to the at least one voice signal by analyzing the at least one voice signal. In other words, the at least one voice signal may be a plurality of voice signals, and the at least one person may be a plurality of persons. The controller 110 may determine that a first voice signal among the plurality of voice signals corresponds to a first person among the plurality of persons. Similarly, the controller 110 may determine that a second voice signal among the plurality of voice signals corresponds to a second person among the plurality of persons. The controller 110 may distinguish at least one person corresponding to the at least one voice signal by identifying the frequency and strength of the at least one voice signal. In this way, the controller 110 may distinguish each of the at least one voice signal having different unique frequency and strength. For example, by analyzing the at least one voice signal, the controller 110 may distinguish the first person A corresponding to the first voice signal, and the second person B corresponding to the second voice signal.

At operation 1240, the controller 110 converts the at least one voice signal into a text corresponding to the at least one voice signal. The controller 110 may convert the at least one voice signal into a text corresponding to the at least one voice signal by analyzing the frequency and strength of the at least one voice signal. The plurality of voice signals may include the first voice signal and the second voice signal. Therefore, the controller 110 may convert the first voice signal into a first text, and the second voice signal into a second text. For example, the controller 110 may convert the first voice signal into the first text such as 'What's up?', and the second voice signal into the second text such as 'Hey~'.

At operation 1245, the controller 110 detects a location where the lip movement for at least one person appearing in the captured content has occurred. The controller 110 may detect a location at which the lip movement for at least one person appearing in the captured content has occurred. For example, the captured content may be video, and the location may be coordinate values on the horizontal and vertical axes of the captured video.

The controller 110 may sequentially detect the locations at which the lip movements for the plurality of persons appearing in the captured video have occurred. For example, the controller 110 may first detect a location at which a first lip movement for a first person has first occurred in the captured video, and next, the controller 110 may detect a location at which a second lip movement for a second person has next occurred in the captured video.

For example, as illustrated in FIG. 9C, the controller 110 may first detect a location 412 at which a first lip movement for a first person 400 has first occurred in the captured video 202. Next, as illustrated in FIG. 9D, the controller 110 may detect a location 512 at which a second lip movement for a second person has next occurred in the captured video 202.

At operation 1250, the controller 110 displays the text in the detected location at which the lip movement for the at least one person has occurred in the captured content, to correspond to the distinguished at least one person. The controller 110 may sequentially display the text in the detected location at which the lip movement for the at least one person has occurred in the captured content, to correspond to the distinguished at least one person.

For example, as illustrated in FIG. 9C, the controller 110 may display the first text such as 'What's up?' 430 in the detected location 412 at which the first lip movement for the first person 400 has occurred in the captured video 202, to correspond to the first person 400. Next, as illustrated in FIG. 9D, the controller 110 may subsequently display the second text such as 'Hey~' 530 in the detected location 512 at which the second lip movement for the second person 500 has occurred in the captured video 202, to correspond to the second person 500.

In sum, according to various embodiments of the present disclosure, an apparatus and method may distinguish at least one person corresponding to at least one voice signal, and display the text that is converted from the at least one voice signal and that corresponds to the at least one voice signal, in a location at which a lip movement for the at least one person has occurred in the captured content, to correspond to the at least one person. Therefore, as the text that is converted from the at least one voice signal and that corresponds to the at least one voice signal, is immediately displayed in a location at which a lip movement for the at least one person has occurred in the captured content, the user may immediately recognize that the text converted from the at least one voice signal and corresponding to the at least one voice signal corresponds to at least one person on a one-to-one basis.

Figure 10:
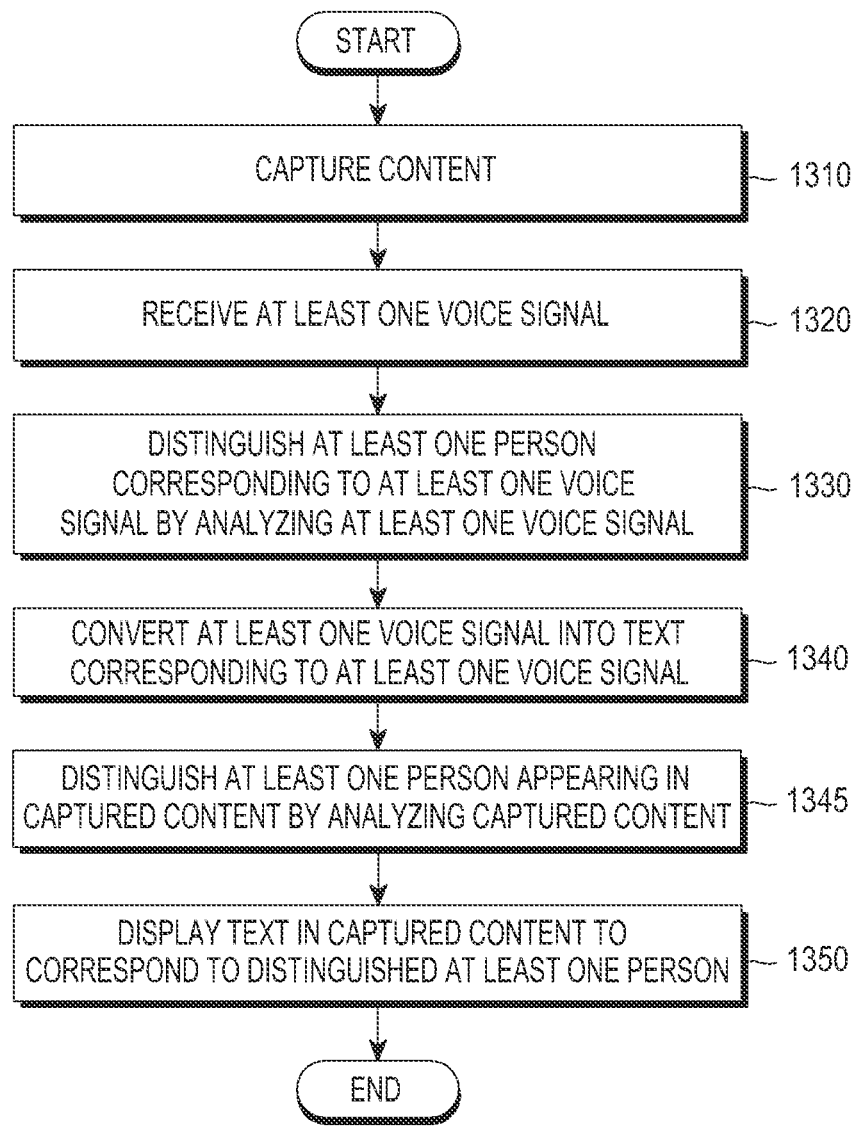
FIG. 10 is a flowchart illustrating a conversation recording method according to an embodiment of the present disclosure.

FIG. 10 is a flowchart illustrating a conversation recording method according to an embodiment of the present disclosure. FIGS. 11A, 11B, 11C, and 11D illustrate a screen of a conversation recording apparatus according to an embodiment of the present disclosure.

Figure 11:
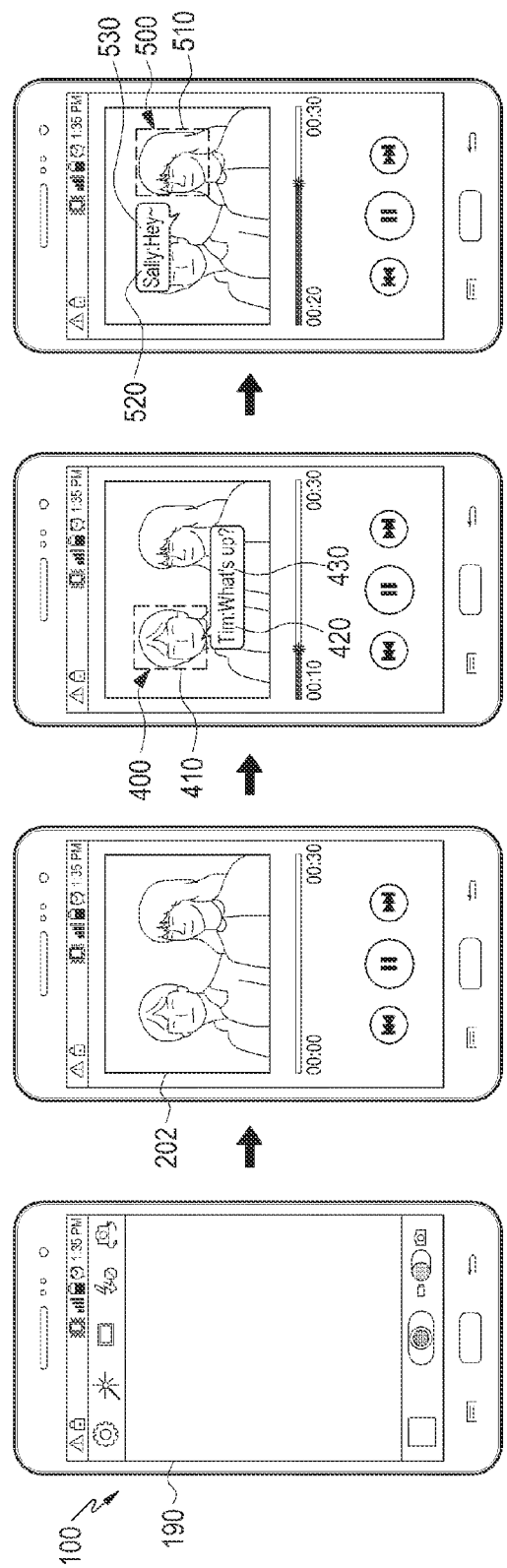
FIGS. 11A, 11B, 11C, and 11D illustrate a screen of a conversation recording apparatus according to an embodiment of the present disclosure.

Referring to FIG. 10, at operation 1310, the controller 110 of the mobile device 100 first captures content. The controller 110 may capture content using the camera module 150. For example, the content may be photos or videos. The captured content may be stored in the storage unit 175. Referring to FIG. 11A, the controller 110 may capture video by running a camera application. As illustrated in FIG. 11B, the controller 110 may display the captured video 202 on the display 190.

At operation 1320, the controller 110 receives at least one voice signal. The controller 110 may receive at least one voice signal using the microphone 162. The received at least one voice signal may be stored in the storage unit 175.

At operation 1330, the controller 110 distinguishes at least one person corresponding to the at least one voice signal by analyzing the at least one voice signal. The controller 110 may distinguish at least one person corresponding to the at least one voice signal by analyzing the at least one voice signal. In other words, the at least one voice signal may be a plurality of voice signals, and the at least one person may be a plurality of persons. The controller 110 may determine that a first voice signal among the plurality of voice signals corresponds to a first person among the plurality of persons. Similarly, the controller 110 may determine that a second voice signal among the plurality of voice signals corresponds to a second person among the plurality of persons. The controller 110 may distinguish at least one person corresponding to the at least one voice signal by identifying the frequency and strength of the at least one voice signal. In this way, the controller 110 may distinguish each of the at least one voice signal having different unique frequency and strength. For example, by analyzing the at least one voice signal, the controller 110 may distinguish the first person A corresponding to the first voice signal, and the second person B corresponding to the second voice signal.

At operation 1340, the controller 110 converts the at least one voice signal into a text corresponding to the at least one voice signal. The controller 110 may convert the at least one voice signal into a text corresponding to the at least one voice signal by analyzing the frequency and strength of the at least one voice signal. The plurality of voice signals may include the first voice signal and the second voice signal. Therefore, the controller 110 may convert the first voice signal into a first text, and the second voice signal into a second text. For example, the controller 110 may convert the first voice signal into the first text such as 'What's up?', and the second voice signal into the second text such as 'Hey~'.

At operation 1345, the controller 110 distinguishes at least one person appearing in the captured content by analyzing the captured content. The controller 110 may distinguish at least one person appearing in the captured content by analyzing the captured content. The controller 110 may extract a name of at least one person corresponding to at least one face (to be specific, face image) by comparing the at least one face with a pre-stored face database by face recognition technology. The pre-stored face database may be formed of a face included in a photo that is stored in a gallery in advance, and a name stored in a contact list.

For example, the controller 110 may extract a name of at least one person corresponding to at least one face by analyzing the captured video and by comparing at least one face appearing in the captured video with faces included in the pre-stored face database.

For example, as illustrated in FIG. 11C, the controller 110 may extract, as 'Tim', a name of a first person 400 corresponding to a first face 410 by comparing the first face 410 appearing in the captured video 202 with faces included in the pre-stored face database. As illustrated in FIG. 11D, the controller 110 may extract, as 'Sally', a name of a second person 500 corresponding to a second face 510 by comparing the second face 510 appearing in the captured video 202 with faces included in the pre-stored face database.

At operation 1350, the controller 110 displays the text in the captured content together with the name of the at least one person to correspond to the distinguished at least one person. The controller 110 may sequentially display the text in the captured content together with the name of the at least one person to correspond to the distinguished at least one person in chronological order of the at least one voice signal.

For example, as illustrated in FIG. 11C, the controller 110 may display the first text such as 'What's up?' 430 in the captured video 202 together with the name 420 of the first person 400 such as 'Tim' to correspond to the first person 400. Next, as illustrated in FIG. 11D, the controller 110 may subsequently display the second text such as 'Hey~' 530 in the captured video 202 together with the name 520 of the second person 500 such as 'Sally' to correspond to the second person 500.

In sum, according to various embodiments of the present disclosure, an apparatus and method may distinguish a face of at least one person corresponding to at least one voice signal, and display the text that is converted from the at least one voice signal and that corresponds to the at least one voice signal, in the captured content together with a name of the at least one person, to correspond to the at least one person.

Figure 12:
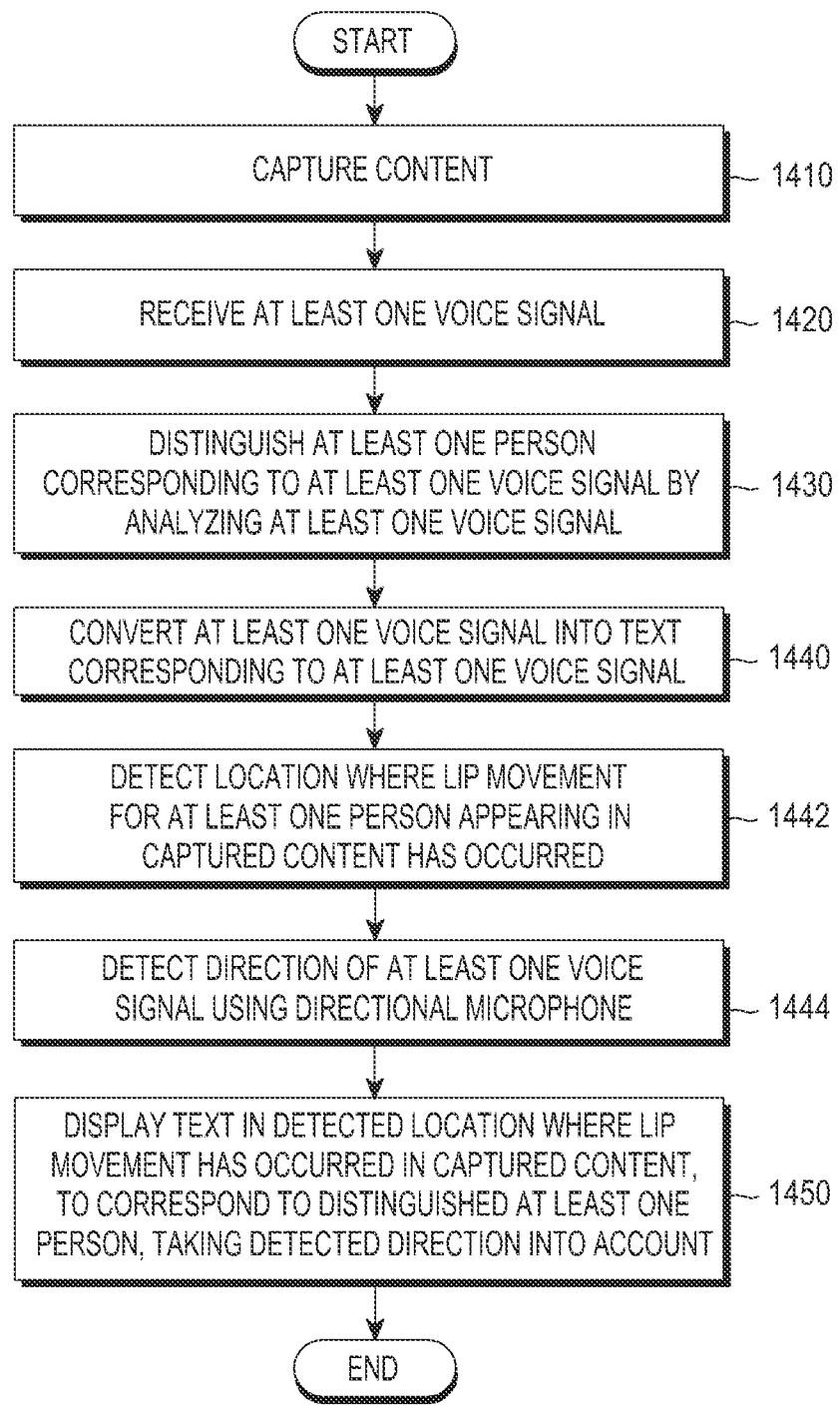
FIG. 12 is a flowchart illustrating a conversation recording method according to an embodiment of the present disclosure.
Figure 13:
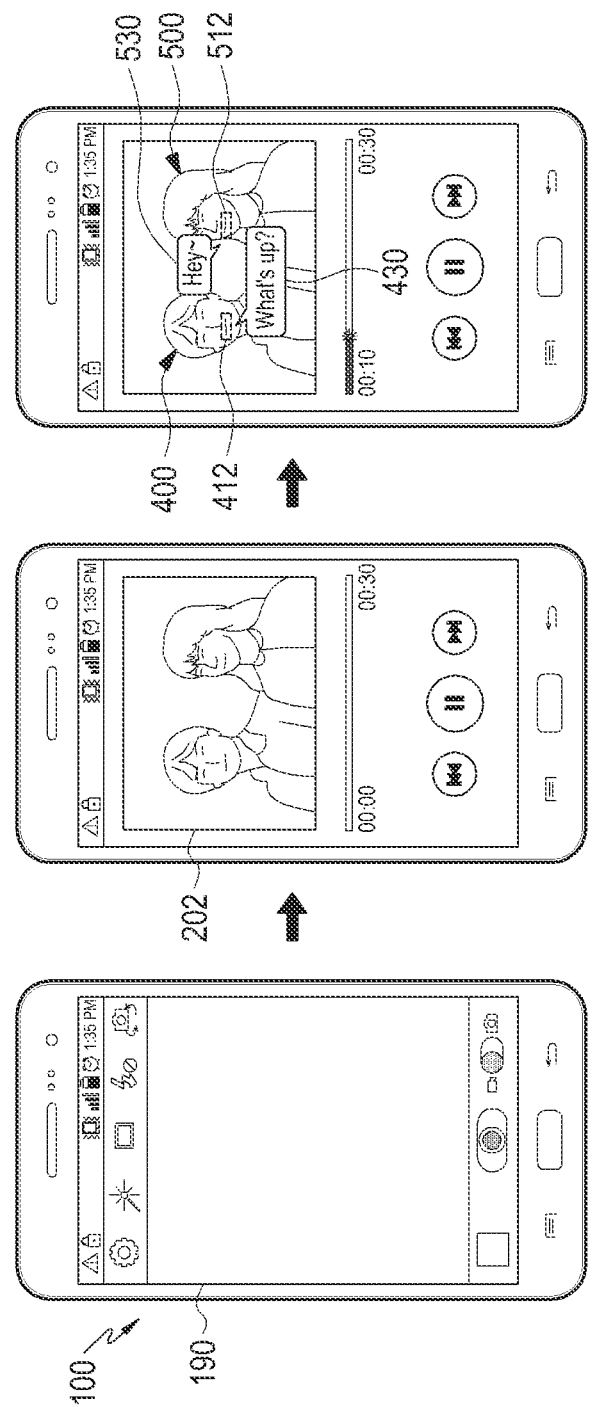
FIGS. 13A, 13B, and 13C illustrate a screen of a conversation recording apparatus according to an embodiment of the present disclosure.

FIG. 12 is a flowchart illustrating a conversation recording method according to an embodiment of the present disclosure. FIGS. 13A, 13B, and 13C illustrate a screen of a conversation recording apparatus according to an embodiment of the present disclosure.

Referring to FIG. 12, at operation 1410, the controller 110 of the mobile device 100 first captures content. The controller 110 may capture content using the camera module 150. For example, the content may be photos or videos. The captured content may be stored in the storage unit 175. Referring to FIG. 13A, the controller 110 may capture video by running a camera application. As illustrated in FIG. 13B, the controller 110 may display the captured video 202 on the display 190 as illustrated in FIG. 13B.

At operation 1420, the controller 110 receives at least one voice signal. The controller 110 may receive at least one voice signal using the microphone 162. The received at least one voice signal may be stored in the storage unit 175.

At operation 1430, the controller 110 distinguishes at least one person corresponding to the at least one voice signal by analyzing the at least one voice signal. The controller 110 may distinguish at least one person corresponding to the at least one voice signal by analyzing the at least one voice signal. In other words, the at least one voice signal may be a plurality of voice signals, and the at least one person may be a plurality of persons. The controller 110 may determine that a first voice signal among the plurality of voice signals corresponds to a first person among the plurality of persons. Similarly, the controller 110 may determine that a second voice signal among the plurality of voice signals corresponds to a second person among the plurality of persons. The controller 110 may distinguish at least one person corresponding to the at least one voice signal by identifying the frequency and strength of the at least one voice signal. In this way, the controller 110 may distinguish each of the at least one voice signal having different unique frequency and strength. For example, by analyzing the at least one voice signal, the controller 110 may distinguish the first person A corresponding to the first voice signal, and the second person B corresponding to the second voice signal.

At operation 1440, the controller 110 converts the at least one voice signal into a text corresponding to the at least one voice signal. The controller 110 may convert the at least one voice signal into a text corresponding to the at least one voice signal by analyzing the frequency and strength of the at least one voice signal. The plurality of voice signals may include the first voice signal and the second voice signal. Therefore, the controller 110 may convert the first voice signal into a first text, and the second voice signal into a second text. For example, the controller 110 may convert the first voice signal into the first text such as 'What's up?', and the second voice signal into the second text such as 'Hey~'.

At operation 1442, the controller 110 detects a location at which the lip movement for at least one person appearing in the captured content has occurred. The controller 110 may detect a location at which the lip movement for at least one person appearing in the captured content has occurred. For example, the captured content may be video, and the location may be coordinate values on the horizontal and vertical axes of the captured video.

For example, as illustrated in FIG. 13C, the controller 110 may detect a location 412 at which a first lip movement for the first person 400 has occurred in the captured video 202, and a location 512 at which a second lip movement for the second person 500 has occurred in the captured video 202.

At operation 1444, the controller 110 detects a direction of the at least one voice signal using a directional microphone. The controller 110 may detect a direction of the at least one voice signal using a directional microphone. The microphone 162 of the mobile device 100 may be formed as a directional microphone. The directional microphone refers to a microphone capable of detecting a direction of the at least one voice signal. A plurality of directional microphones may be formed or mounted in the mobile device 100. Therefore, the controller 110 may extract or detect a direction of a certain voice signal by analyzing voice signals received from the plurality of directional microphones.

Figure 14:
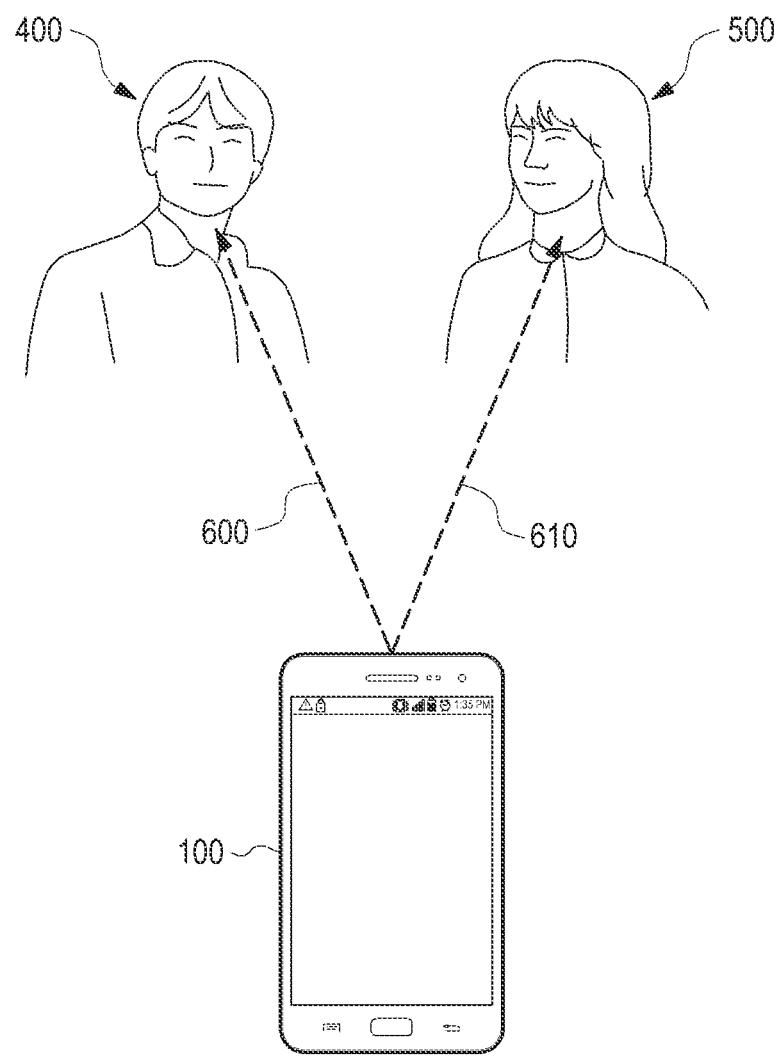
FIG. 14 illustrates a scenario of detecting a direction of at least one voice signal using a directional microphone according to an embodiment of the present disclosure.

FIG. 14 illustrates a scenario of detecting a direction of at least one voice signal using a directional microphone.

Referring to FIG. 14, for example, the controller 110 may detect a first direction 600 of the first voice signal generated from the first person 400, as a left direction. The controller 110 may detect a second direction 610 of the second voice signal generated from the second person 500, as a right direction.

At operation 1450, the controller 110 displays the text in the detected location at which the lip movement for the at least one person has occurred in the captured content, to correspond to the distinguished at least one person, taking the detected direction into account. The controller 110 may display the text in the detected location at which the lip movement for the at least one person has occurred in the captured content, to correspond to the distinguished at least one person, taking the detected direction into account.

For example, as illustrated in FIG. 13C, the controller 110 may display the first text such as 'What's up?' 430 in the detected location 412 at which the first lip movement has occurred, located on the left side of the captured video 202, to correspond to the first person 400, taking into account the first direction 600 which is the left direction. The controller 110 may display the second text such as 'Hey~' 530 in the detected location 512 at which the second lip movement has occurred, located on the right side of the captured video 202, to correspond to the second person 500, taking into account the second direction 610 which is the right direction.

In sum, according to various embodiments of the present disclosure, an apparatus and method may display the text that is converted from at least one voice signal and that corresponds to the at least one voice signal, in the location at which the lip movement has occurred in the captured content, taking into account the direction of the voice signal, which is detected using a directional microphone. According to various embodiments of the present disclosure, the apparatus and method may display the texts in their correct locations even in the conversation situation where different voice signals are generated at the same time, because the apparatus and method may display the text in the location at which the lip movement has occurred in the captured content, taking into account the direction of the voice signal, which is detected using a direction microphone.

Figure 15:
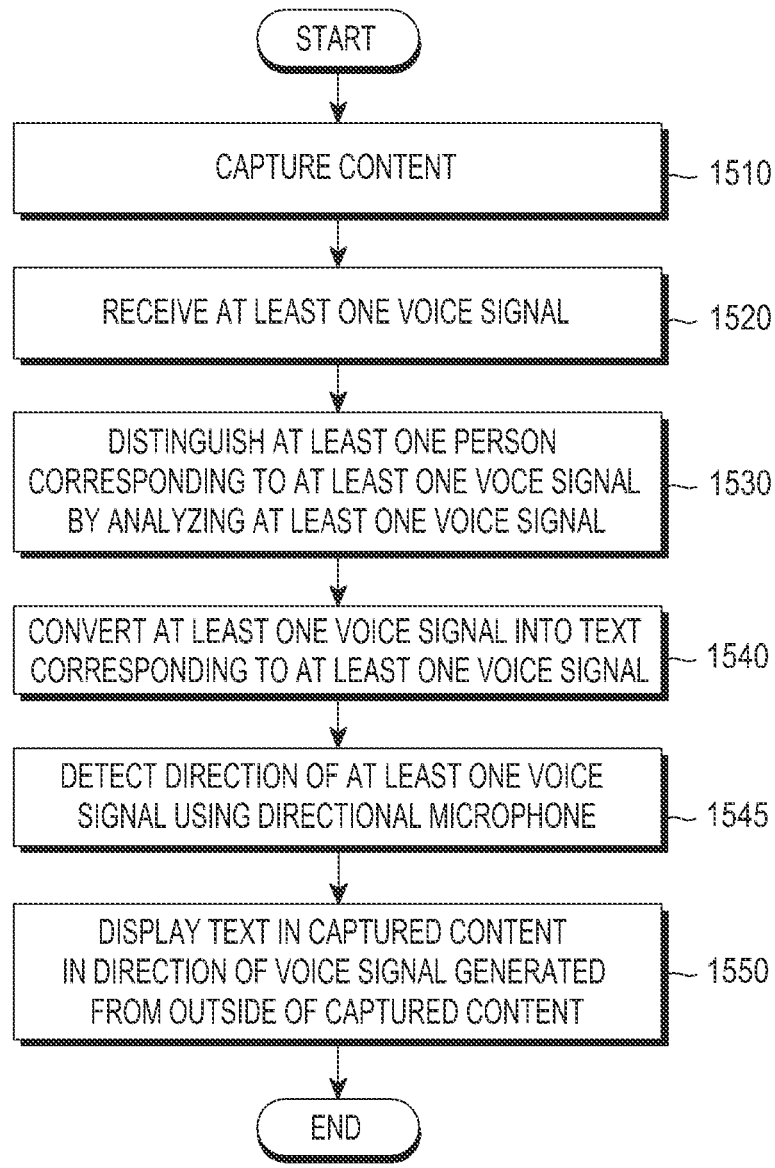
FIG. 15 is a flowchart illustrating a conversation recording method according to an embodiment of the present disclosure.
Figure 16:
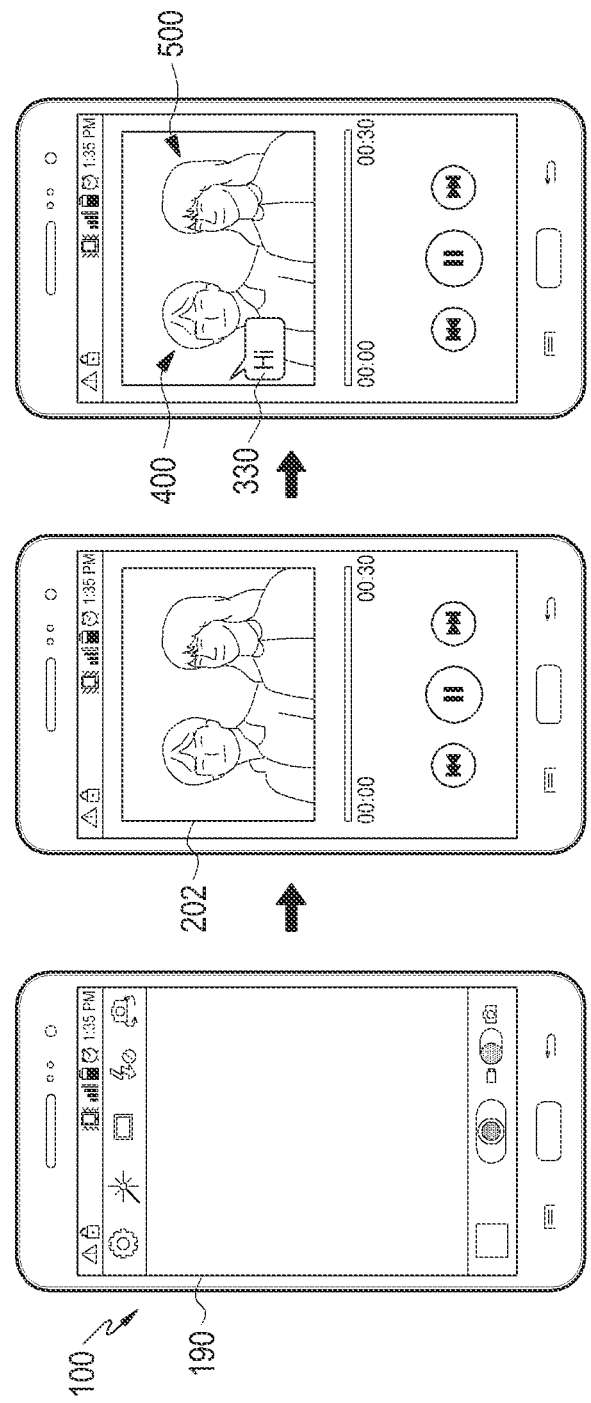
FIGS. 16A, 16B, and 16C illustrate a screen of a conversation recording apparatus according to an embodiment of the present disclosure.

FIG. 15 is a flowchart illustrating a conversation recording method according to an embodiment of the present disclosure. FIGS. 16A, 16B, and 16C illustrate a screen of a conversation recording apparatus according to an embodiment of the present disclosure.

Referring to FIG. 15, at operation 1510, the controller 110 of the mobile device 100 first captures content. The controller 110 may capture content using the camera module 150. For example, the content may be photos or videos. The captured content may be stored in the storage unit 175. Referring to FIG. 16A, the controller 110 may capture video by running a camera application. The controller 110 may display the captured video 202 on the display 190 as illustrated in FIG. 16B.

At operation 1520, the controller 110 receives at least one voice signal. The controller 110 may receive at least one voice signal using the microphone 162. The received at least one voice signal may be stored in the storage unit 175.

At operation 1530, the controller 110 distinguishes at least one person corresponding to the at least one voice signal by analyzing the at least one voice signal. The controller 110 may distinguish at least one person corresponding to the at least one voice signal by analyzing the at least one voice signal. In other words, the at least one voice signal may be a plurality of voice signals, and the at least one person may be a plurality of persons. The controller 110 may determine that a first voice signal among the plurality of voice signals corresponds to a first person among the plurality of persons. Similarly, the controller 110 may determine that a second voice signal among the plurality of voice signals corresponds to a second person among the plurality of persons. In the same way, the controller 110 may determine that a third voice signal among the plurality of voice signals corresponds to a third person among the plurality of persons. The controller 110 may distinguish at least one person corresponding to the at least one voice signal by identifying the frequency and strength of the at least one voice signal. In this way, the controller 110 may distinguish each of the at least one voice signal having different unique frequency and strength. For example, by analyzing the at least one voice signal, the controller 110 may distinguish the first person A corresponding to the first voice signal, the second person B corresponding to the second voice signal, and the third person C corresponding to the third voice signal.

At operation 1540, the controller 110 converts the at least one voice signal into a text corresponding to the at least one voice signal. The controller 110 may convert the at least one voice signal into a text corresponding to the at least one voice signal by analyzing the frequency and strength of the at least one voice signal. The plurality of voice signals may include the first voice signal, the second voice signal, and the third voice signal. Therefore, the controller 110 may convert the first voice signal into a first text, the second voice signal into a second text, and the third voice signal into a third text. For example, the controller 110 may convert the first voice signal into the first text such as 'What's up?', the second voice signal into the second text such as 'Hey~', and the third voice signal into the third text such as 'Hi'.

At operation 1545, the controller 110 detects a direction of the at least one voice signal using a directional microphone. The controller 110 may detect a direction of the at least one voice signal using a directional microphone. The microphone 162 of the mobile device 100 may be formed as a directional microphone. The directional microphone refers to a microphone capable of detecting a direction of the at least one voice signal. A plurality of directional microphones may be formed or mounted in the mobile device 100. Therefore, the controller 110 may extract or detect a direction of a certain voice signal by analyzing voice signals received from the plurality of directional microphones.

Figure 17:
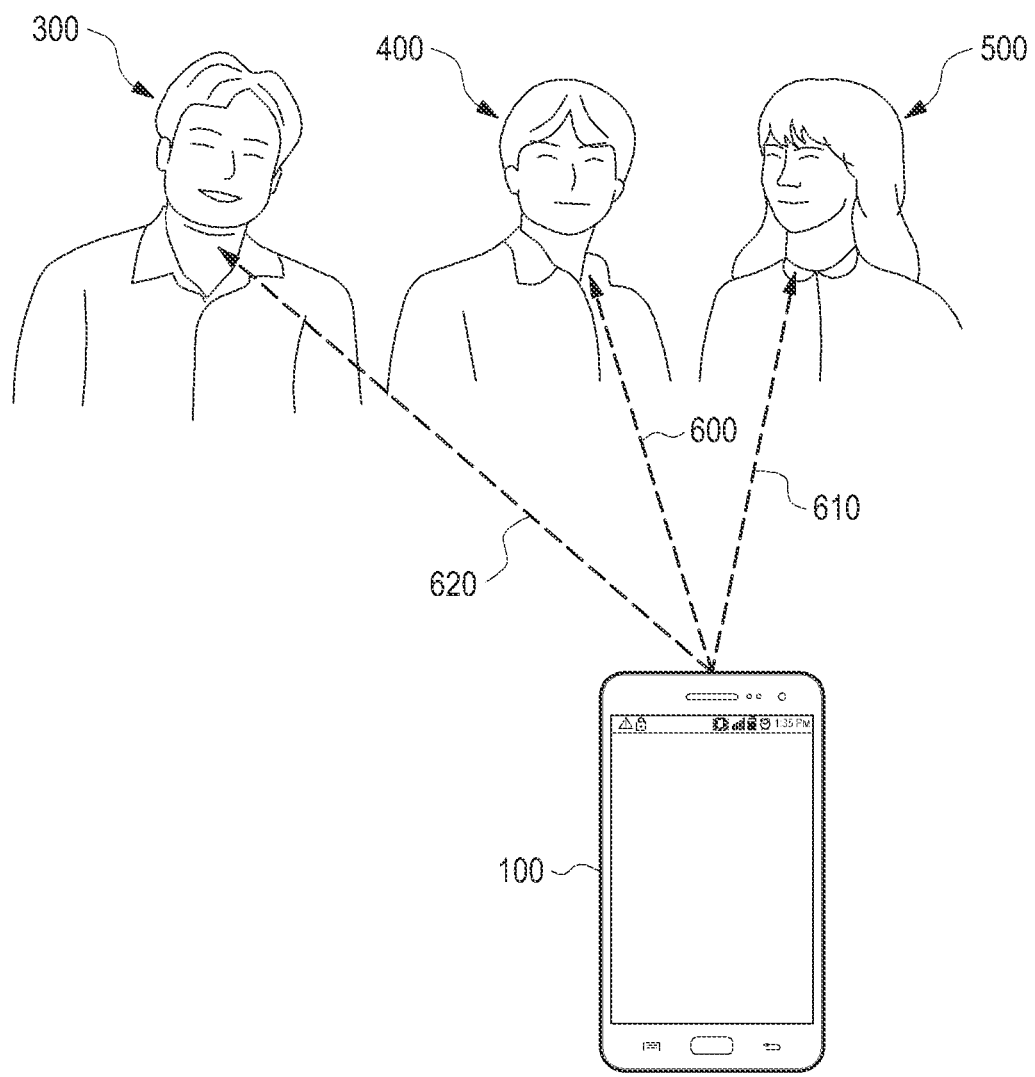
FIG. 17 illustrates a scenario of detecting a direction of at least one voice signal using a directional microphone according to an embodiment of the present disclosure.

FIG. 17 illustrates a scenario of detecting a direction of at least one voice signal using a directional microphone according to an embodiment of the present disclosure.

Referring to FIG. 17, for example, the controller 110 of the mobile device 100 may detect a first direction 600 of the first voice signal generated from the first person 400, as a left direction. The controller 110 may detect a second direction 610 of the second voice signal generated from the second person 500, as a right direction. The controller 110 may detect a third direction 620 of the third voice signal generated from the third person 300, as an external direction which is out of the captured video.

At operation 1550, the controller 110 displays the text in the captured content in a direction of a voice signal generated from the outside of the captured content. The controller 110 may display the text in the captured content in a direction of a voice signal generated from the outside of the captured content.

For example, as illustrated in FIG. 16C, the controller 110 may display the third text such as 'Hi' 330 in the captured video 202 to correspond to the third person 300, taking into account the third direction 620 such as an external direction which is out of the captured video.

In sum, according to various embodiments of the present disclosure, an apparatus and method may display the text that is converted from at least one voice signal and that corresponds to the at least one voice signal, in the captured content, taking into account the direction of the voice signal generated from the outside of the captured video, the direction being detected using a directional microphone. Therefore, the user may immediately recognize that a person corresponding to the text exists outside the captured video, upon recognizing the text that is displayed taking into account the direction of the voice signal generated from the outside of the captured video.

Various embodiments of the present disclosure may be implemented by hardware, software, and/or a combination thereof. The software may be stored in volatile or non-volatile storages such as, for example, ROM (including erasable ROM and rewritable ROM), in memories such as, for example, RAM, memory chip and memory Integrated Circuit (ID), and in optically/magnetically recordable and non-transitory machine-readable storage media such as, for example, Compact Disc (CD), Digital Versatile Disc (DVD), magnetic disc, magnetic tape, and the like. Various embodiments of the present disclosure may be implemented by computers or mobile terminals including a controller and a memory. The memory may be an example of non-transitory machine-readable storage media (e.g., non-transitory computer-readable storage media) which are suitable to store a program or programs including instructions that implement various embodiments of the present disclosure. Therefore, various embodiments of the present disclosure include a program(s) including codes for implementing the apparatus and method as set forth in the appended claims, and non-transitory machine-readable storage media storing the programs. These programs may be electronically transported through any medium such as communication signals which are delivered through wire/wireless connections, and various embodiments of the present disclosure may include equivalents thereof.

The mobile device may receive and store the program from a program server, to which the mobile device is connected by wire or wirelessly. The program server may include a memory for storing the program including instructions for implementing various embodiments of the present disclosure, and for storing information necessary for various embodiments of the present disclosure, a communication unit for performing wire/wireless communication with the mobile device, and a controller for controlling a transceiver to transmit the program upon request of the mobile device, or automatically.

As is apparent from the foregoing description, according to various embodiments of the present disclosure, an apparatus and method may distinguish at least one person corresponding to at least one voice signal, and display the text that is converted from the at least one voice signal and corresponds to the at least one voice signal, in the captured content to correspond to the at least one person. In other words, according to various embodiments of the present disclosure, the apparatus and method may display not only the text that is converted from the at least one voice signal and that corresponds to the at least one voice signal, but also the text corresponding to the at least one voice signal, in the captured content to correspond to the at least one person. Therefore, the user may immediately recognize that the text converted from the at least one voice signal and corresponding to the at least one voice signal corresponds to at least one person on a one-to-one basis.

According to various embodiments of the present disclosure, the apparatus and method may distinguish at least one person corresponding to at least one voice signal, and may display the text that is converted from the at least one voice signal and that corresponds to the at least one voice signal, in the captured content together with a name of the at least one person to correspond to the distinguished at least one person.

According to various embodiments of the present disclosure, the apparatus and method may distinguish at least one person corresponding to at least one voice signal, and may display the text that is converted from the at least one voice signal and that corresponds to the at least one voice signal, in a location at which a lip movement for the at least one person has occurred in the captured content, to correspond to the at least one person.

According to various embodiments of the present disclosure, the apparatus and method may display the text that is converted from at least one voice signal and that corresponds to the at least one voice signal, in the location at which the lip movement has occurred in the captured content, taking into account the direction of the voice signal, which is detected using a directional microphone.

According to various embodiments of the present disclosure, the apparatus and method may display the text that is converted from at least one voice signal and that corresponds to the at least one voice signal, in the captured content, taking into account the direction of the voice signal generated from the outside of the captured video, the direction being detected using a directional microphone.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for recording a conversation, the method comprising:
    capturing image content;
    receiving at least one voice signal;
    distinguishing at least one person corresponding to the at least one voice signal by analyzing the at least one voice signal;
    converting the at least one voice signal into text corresponding to the at least one voice signal;
    detecting a direction of the at least one voice signal using a plurality of directional microphones disposed within an apparatus; and
    displaying the text in the captured image content in the detected direction of the at least one voice signal based on a location of the distinguished at least one person determined according to the detected direction of the at least one voice signal.

2. The method of claim 1, wherein the distinguishing of the at least one person corresponding to the at least one voice signal comprises:
    extracting a name of the at least one person corresponding to the at least one voice signal by comparing the at least one voice signal with a pre-stored voice database.

3. The method of claim 2, wherein the pre-stored voice database comprises at least one voice signal that is stored in advance during a phone call, and at least one name stored in a contact list.

4. The method of claim 1, wherein the displaying of the text in the captured image content comprises:
    displaying the text in the captured image content together with a name of the at least one person based on the location of the distinguished at least one person.

5. The method of claim 1, further comprising:
    detecting a location at which lip movement for the at least one person appearing in the captured image content has occurred,
    wherein the displaying of the text in the captured image content comprises displaying the text at the detected location at which the lip movement has occurred in the captured image content, based on the location of the distinguished at least one person.

6. The method of claim 1, further comprising:
distinguishing at least one person appearing in the captured image content by analyzing the captured image content.

7. The method of claim 6, wherein the distinguishing of the at least one person appearing in the captured image content comprises extracting a name of the at least one person corresponding to at least one face by comparing the at least one face with a pre-stored face database.

8. The method of claim 7, wherein the pre-stored face database comprises a face included in a photo that is stored in advance in a gallery, and a name stored in a contact list.

9. The method of claim 5,
wherein the displaying of the text in the captured image content comprises displaying the text at the detected location at which lip movement for the at least one person appearing in the captured image content has occurred.

10. The method of claim 1,
wherein the displaying of the text in the captured image content comprises displaying the text in the captured image content in the detected direction of the at least one voice signal that is generated from outside a field of view of the captured image content.

11. The method of claim 1,
wherein, if the distinguished at least one person is determined to be in the captured image content, the text is displayed at the location in the captured image content based on the location of the distinguished at least one person to associate the text with the distinguished at least one person, and
wherein, if the distinguished at least one person is not determined to be in the captured image content, the text is displayed in the captured image content and is not associated with a person appearing in the captured image content.

12. The method of claim 1, wherein the displaying of the text at the location in the captured image content based on the location of the distinguished at least one person is performed on the captured image content after capturing the image content.

13. An apparatus for recording a conversation, the apparatus comprising:
at least one processor configured to:
capture image content,
receive at least one voice signal,
distinguish at least one person corresponding to the at least one voice signal by analyzing the at least one voice signal,
convert the at least one voice signal into text corresponding to the at least one voice signal,
detect a direction of the at least one voice signal using a plurality of directional microphones disposed within the apparatus, and
display the text in the captured image content in the detected direction of the at least one voice signal based on a location of the distinguished at least one person determined according to the detected direction of the at least one voice signal;
a camera configured to capture the image content; and
a display configured to display the image content together with the text.

14. The apparatus of claim 13, wherein, when distinguishing the at least one person corresponding to the at least one voice signal by analyzing the at least one voice signal, the at least one processor is further configured to extract a name of the at least one person corresponding to the at least one voice signal by comparing the at least one voice signal with a pre-stored voice database.

15. The apparatus of claim 14, wherein the pre-stored voice database comprises a voice signal that is stored in advance during a phone call, and a name stored in a contact list.

16. The apparatus of claim 13, wherein, when displaying the text in the captured image content to correspond to the distinguished at least one person, the at least one processor is further configured to display the text in the captured image content together with a name of the at least one person to correspond to the distinguished at least one person.

17. The apparatus of claim 13, wherein the at least one processor is further configured to:
detect a location at which lip movement for the at least one person appearing in the captured image content has occurred, and
when displaying the text in the captured image content based on the location of the distinguished at least one person, display the text at the detected location at which the lip movement has occurred in the captured image content, based on the location of the distinguished at least one person.

18. The apparatus of claim 13, wherein the at least one processor is further configured to distinguish at least one person appearing in the captured image content by analyzing the captured image content.

19. The apparatus of claim 18, wherein, when distinguishing the at least one person appearing in the captured image content by analyzing the captured image content, the at least one processor is further configured to extract a name of the at least one person corresponding to at least one face by comparing the at least one face with a pre-stored face database.

20. The apparatus of claim 19, wherein the pre-stored face database comprises a face included in a photo that is stored in advance in a gallery, and a name stored in a contact list.

21. The apparatus of claim 17, wherein the at least one processor is further configured to:
when displaying the text in the captured image content based on the location of the distinguished at least one person, display the text at the detected location at which lip movement for the at least one person appearing in the captured image content has occurred.

22. The apparatus of claim 13, wherein the at least one processor is further configured to:
when displaying the text in the captured image content based on the location of the distinguished at least one person, display the text in the captured image content in the detected direction of the at least one voice signal that is generated from outside a field of view of the captured image content.

23. A non-transitory computer-readable storage medium storing instructions that, when executed, cause at least one processor to perform the method of claim 1.

* * * * *